United States Patent
Feng et al.

(10) Patent No.: US 9,379,870 B2
(45) Date of Patent: Jun. 28, 2016

(54) SEARCH SPACE RECONFIGURATION FOR ENHANCED-PDCCH

(75) Inventors: Sujuan Feng, Frankfurt am Main (DE); Toru Oizumi, Osaka (JP); Ayako Horiuchi, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 177 days.

(21) Appl. No.: 14/240,671

(22) PCT Filed: Aug. 8, 2012

(86) PCT No.: PCT/EP2012/065531
§ 371 (c)(1),
(2), (4) Date: Apr. 30, 2014

(87) PCT Pub. No.: WO2013/029946
PCT Pub. Date: Mar. 7, 2013

(65) Prior Publication Data
US 2014/0233481 A1 Aug. 21, 2014

(30) Foreign Application Priority Data
Aug. 26, 2011 (EP) .................................. 11179035

(51) Int. Cl.
*H04L 1/00* (2006.01)
*H04L 5/00* (2006.01)
*H04L 1/16* (2006.01)
*H04W 72/04* (2009.01)
(Continued)

(52) U.S. Cl.
CPC ............ *H04L 5/0055* (2013.01); *H04L 1/1685* (2013.01); *H04L 5/0053* (2013.01); *H04W 72/042* (2013.01)

(58) Field of Classification Search
CPC ......... H04L 47/10; H04L 47/11; H04L 47/12; H04L 47/13; H04L 47/14; H04L 47/30; H04W 80/04; H04W 80/05; H04W 80/06; H04W 80/07; H04W 80/08; H04W 76/00
USPC ......... 370/229, 230, 235, 328, 329, 330, 341, 370/338
See application file for complete search history.

(56) References Cited

U.S. PATENT DOCUMENTS

2013/0223299 A1* 8/2013 Yang ..................... H04L 1/1685
370/280
2013/0223300 A1* 8/2013 Yang ..................... H04L 1/1861
370/280
(Continued)

FOREIGN PATENT DOCUMENTS

EP 2352350 A1 8/2011

OTHER PUBLICATIONS

European Search Report for Application No. EP 11179035 dated Feb. 9, 2012.
(Continued)

*Primary Examiner* — Dady Chery
(74) *Attorney, Agent, or Firm* — Pearne & Gordon LLP

(57) ABSTRACT

The present invention relates to rapid search space reconfiguration for E-PDCCH (Enhanced Physical Downlink Control CHannel) in wireless communication system to avoid flashlight interferences from neighboring cells and to allocate the E-PDCCH on the best physical resource blocks (PRBs) in frequency fluctuation dominated scenarios. To this end, a method for providing low-latency feedback on a reconfiguration attempt of a search space for an Enhanced-PDCCH, and a corresponding apparatus are provided. Specifically, a signaling scheme is provided that supports transmission of both HARQ-ACK for PDCCH based E-PDCCH reconfiguration and HARQ-ACK for PDSCH (Physical Downlink Shared CHannel) on the same uplink subframe, so that an acknowledgment of PDCCH based E-PDCCH reconfiguration information and PDSCH information can be transmitted on the same subframe.

19 Claims, 19 Drawing Sheets

(56) References Cited

U.S. PATENT DOCUMENTS

| | | | | |
|---|---|---|---|---|
| 2013/0258914 A1* | 10/2013 | Seo | | H04L 1/1896 370/280 |
| 2013/0265914 A1* | 10/2013 | Ahn | | H04B 7/2656 370/280 |
| 2014/0241311 A1* | 8/2014 | Berggren | | H04L 1/1614 370/330 |
| 2015/0117271 A1* | 4/2015 | Liang | | H04L 1/1812 370/280 |

OTHER PUBLICATIONS

Panasonic: "Further discussion on PDCCH with cross carrier operation", 3GPP Draft; R1-100361, 3rd Generation Partnership Project (3GPP), Mobile Competence Centre; 650, Route Des Lucioles; F-06921 Sophia-Antiplois Cedex; France. vol. RAN WG1, no. Valencia, Spain; Jan. 18, 2010, Jan. 12, 2010, XP050418024.

Huawei et al: "Remaining details of FDD ACK/NACK channel selection", 3GPP Draft; R1-110428, 3rd Generation Partnership Project (3GPP), Mobile Competence Centre; 650, Route Des Lucioles; F-06921 Sophia-Antiplois Cedex; France. vol. RAN WG1, no. Dublin, Ireland; Jan. 17, 2011, Jan. 11, 2011, XP0504090260.

Research in Motion UK Limited: "Remaining Issues fir Cross-carrier Scheduling", 3GPP Draft; R1-103065 (Rim-Cross Carrier Scheduling), 3rd Generation Partnership Project (3GPP), Mobile Competence Centre; 650, Route Des Lucioles; F-06921 Sophia-Antiplois Cedex; France. vol. RAN WG1, no. Montreal, Canada; May 10, 2010, May 4, 2010, XP050420154.

* cited by examiner

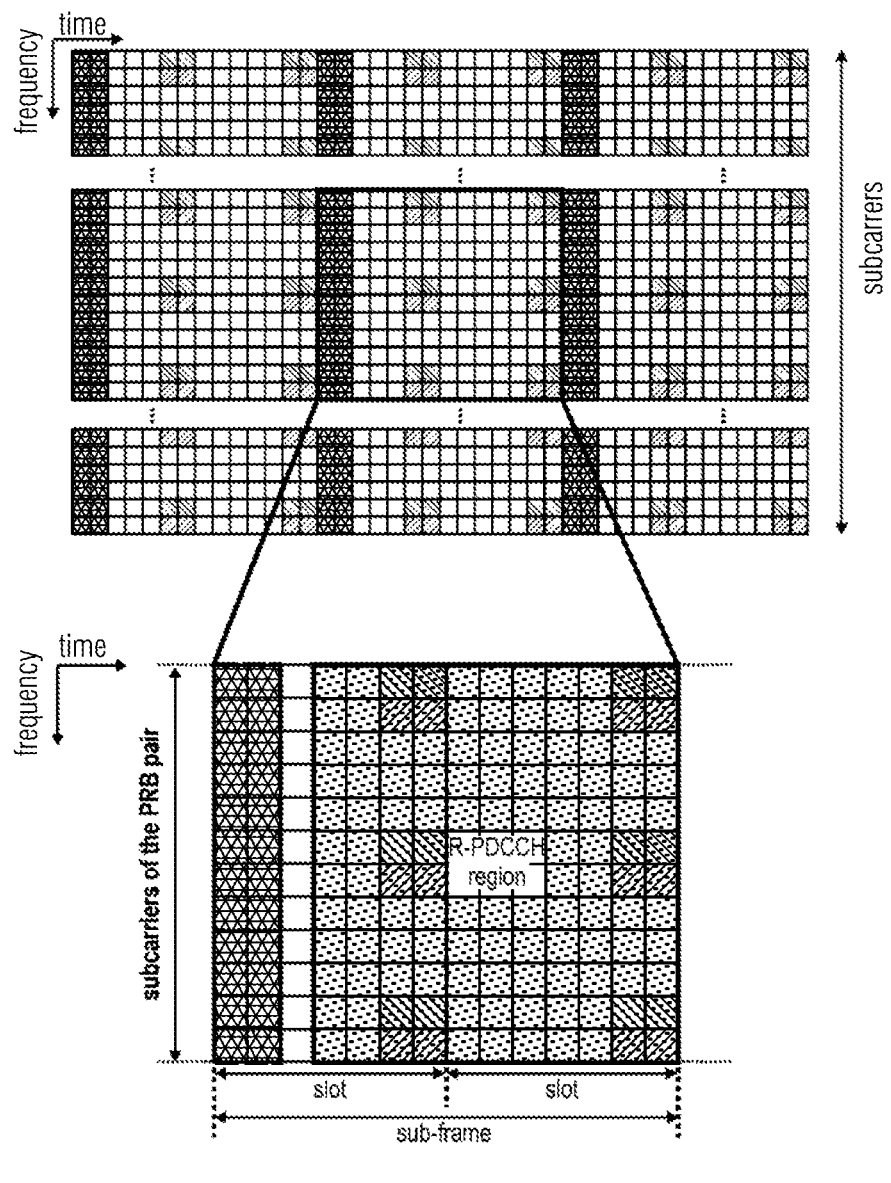
FIG. 3
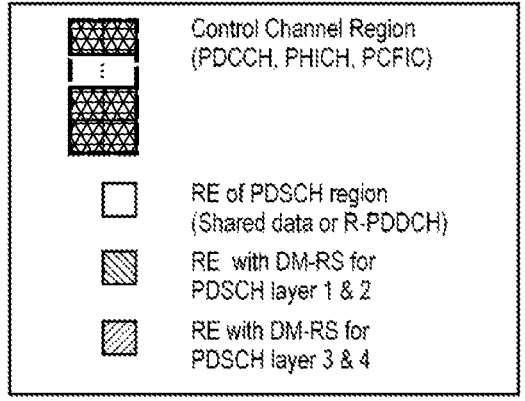

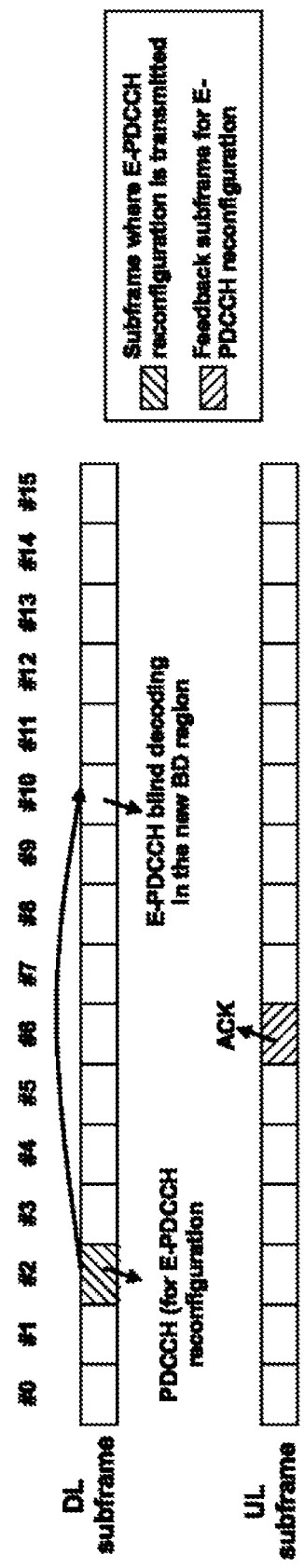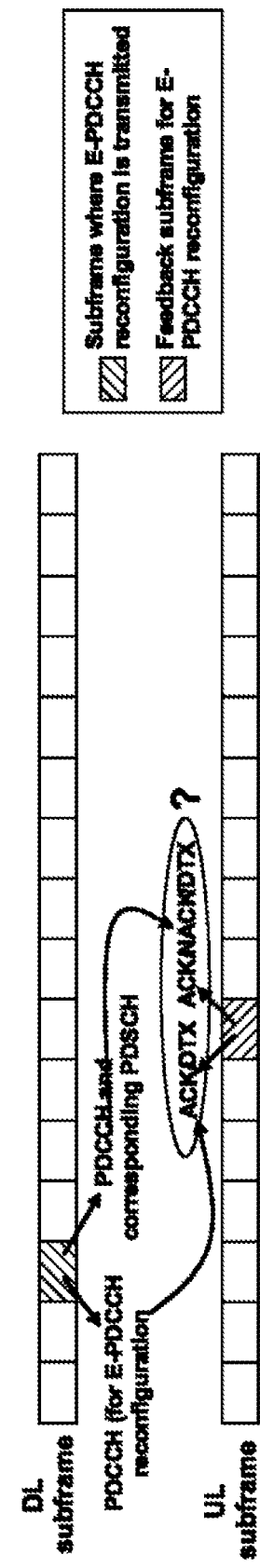

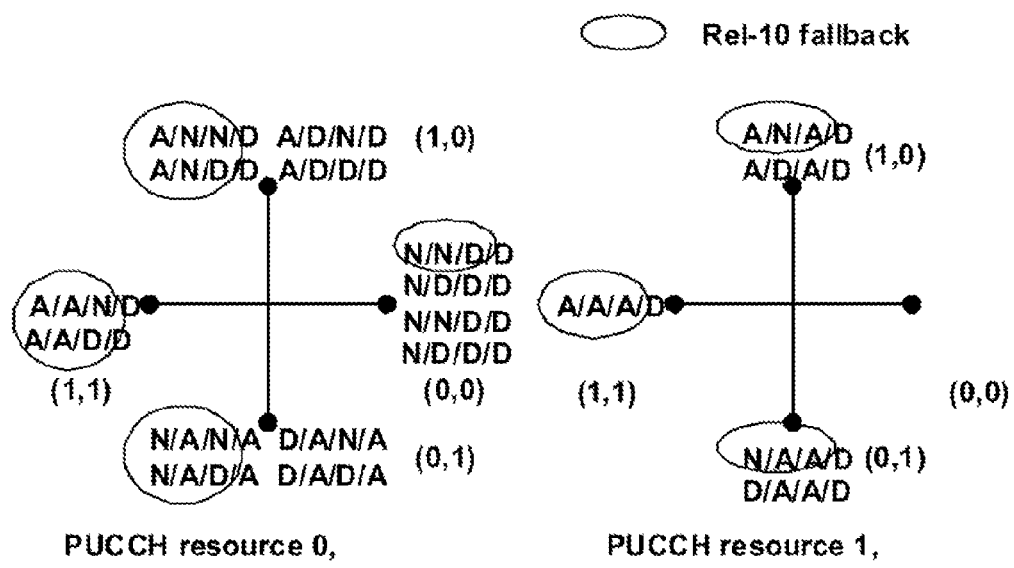
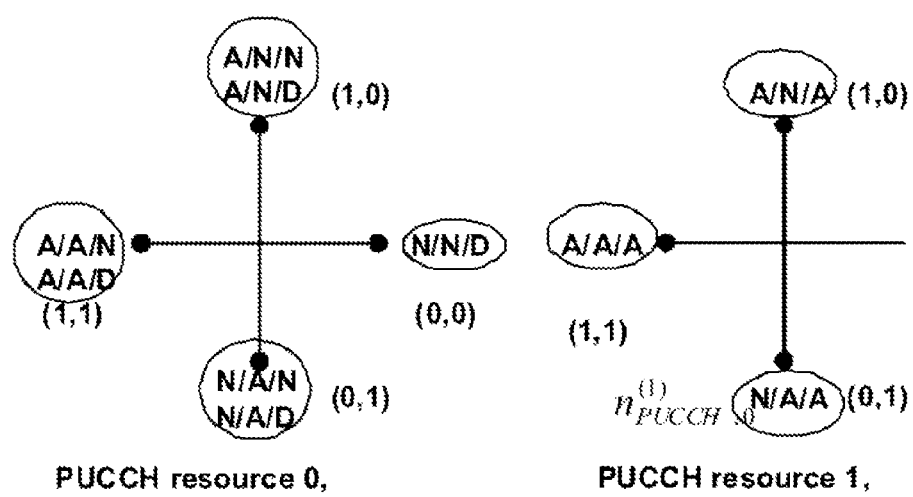
FIG. 12a

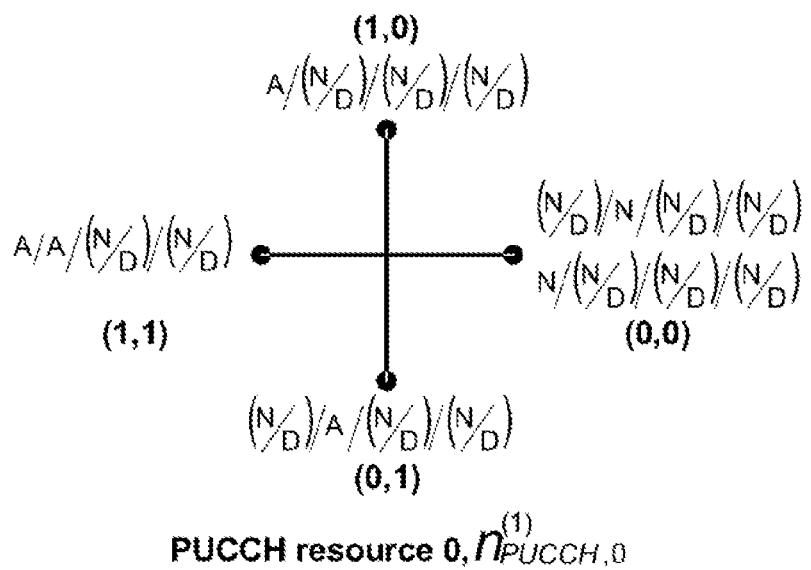
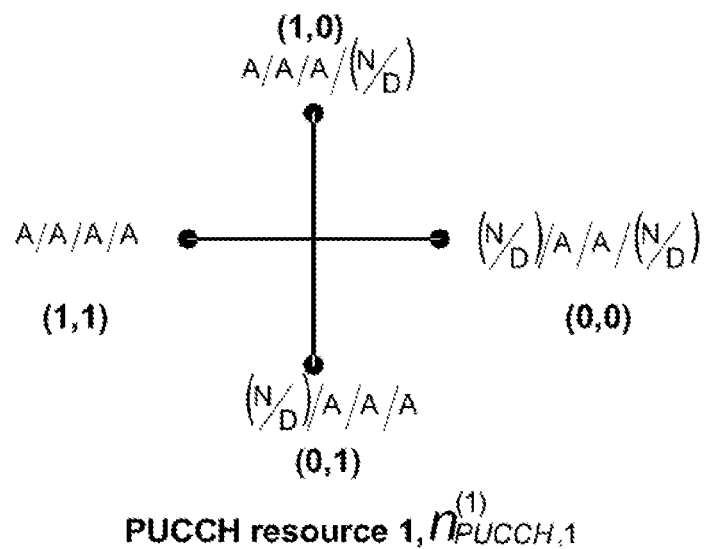
FIG. 14a

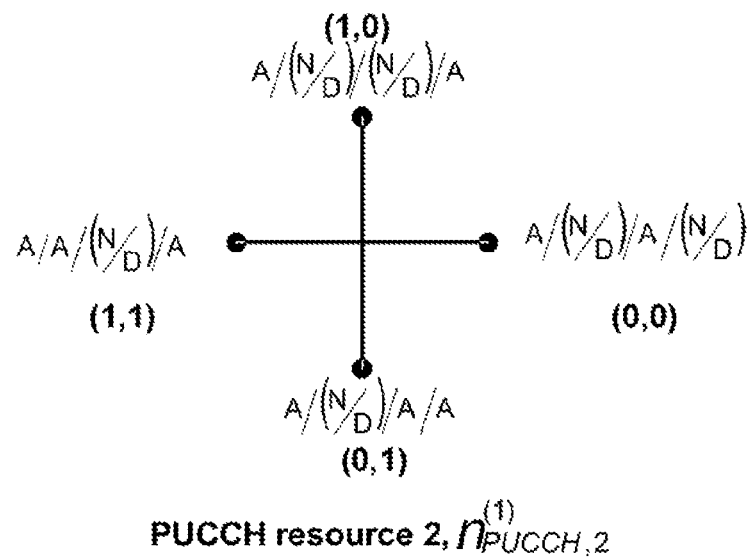
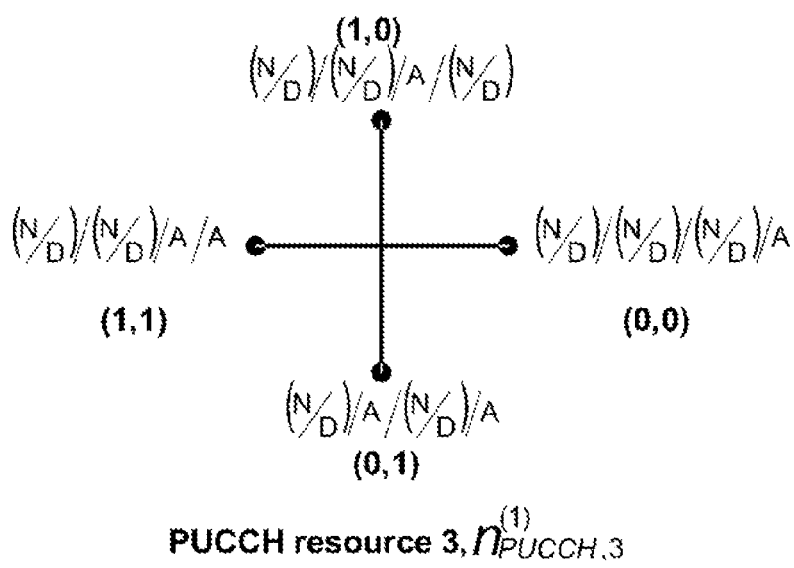
FIG. 14b

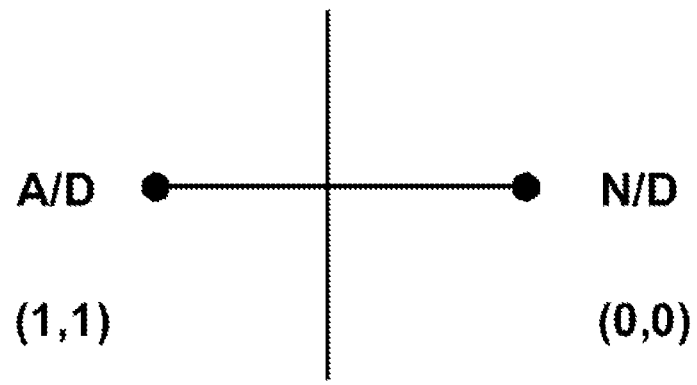
PUCCH resource 0,
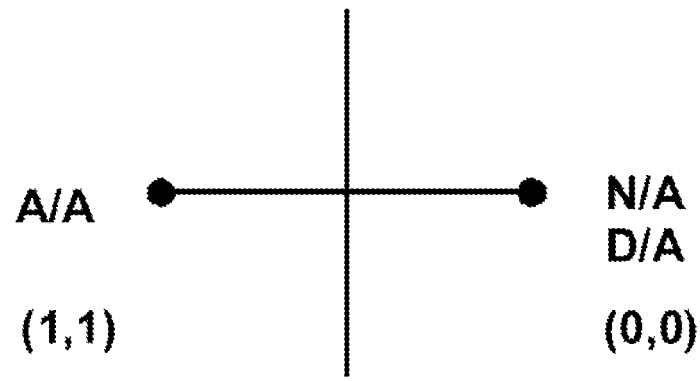
PUCCH resource 1,
FIG. 15

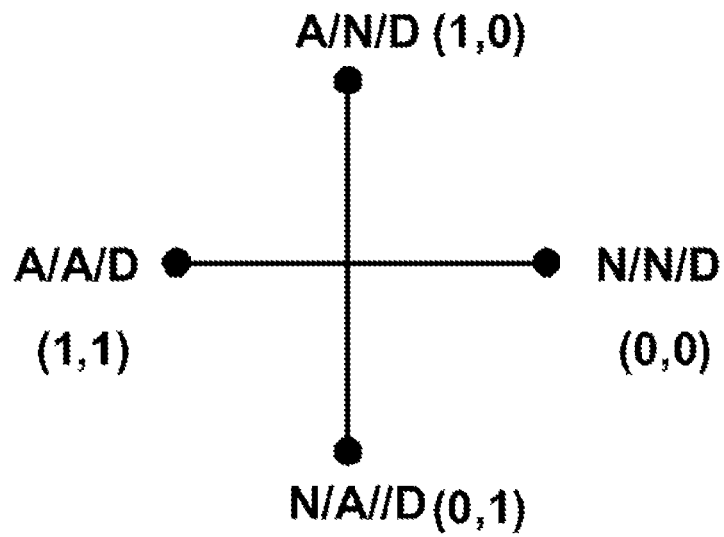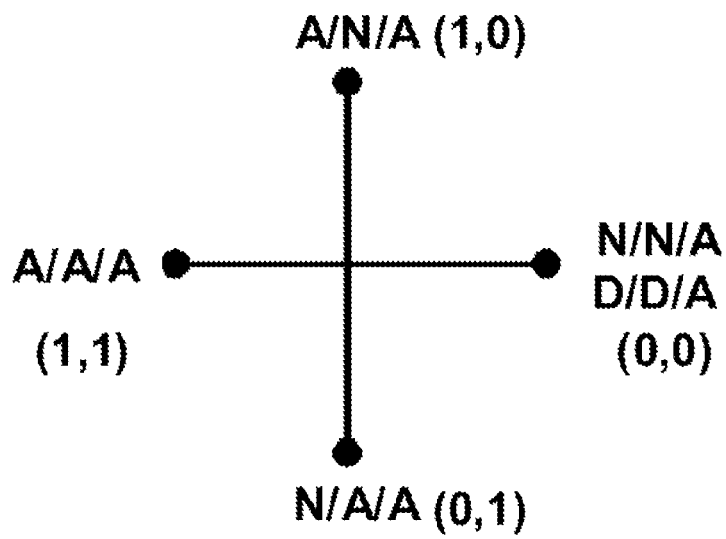
FIG. 16

SEARCH SPACE RECONFIGURATION FOR ENHANCED-PDCCH

FIELD OF THE INVENTION

The present invention relates to rapid search space reconfiguration for Enhanced-PDCCH (Physical Downlink Control CHannel) in wireless communication system, and in particular to a method for providing low-latency feedback on a reconfiguration attempt of a search space for an Enhanced-PDCCH, and a corresponding apparatus.

BACKGROUND OF THE INVENTION

Third generation (3G) mobile systems, such as, for instance, universal mobile telecommunication systems (UMTS) standardized within the third generation partnership project (3GPP) have been based on wideband code division multiple access (WCDMA) radio access technology. Today, 3G systems are being deployed on a broad scale all around the world. After enhancing this technology by introducing high-speed downlink packet access (HSDPA) and an enhanced uplink, also referred to as high-speed uplink packet access (HSUPA), the next major step in evolution of the UMTS standard has brought the combination of orthogonal frequency division multiplexing (OFDM) for the downlink and single carrier frequency division multiplexing access (SC-FDMA) for the uplink. This system has been named long term evolution (LTE) since it has been intended to cope with future technology evolutions.

The LTE system represents efficient packet based radio access and radio access networks that provide full IP-based functionalities with low latency and low cost. The detailed system requirements are given in 3GPP TR 25.913, "Requirements for evolved UTRA (E-UTRA) and evolved UTRAN (E-UTRAN)," v8.0.0, January 2009, (available at http://www.3gpp.org/ and incorporated herein by reference). The Downlink will support data modulation schemes QPSK, 16QAM, and 64QAM and the Uplink will support BPSK, QPSK, 8PSK and 16QAM.

LTE's network access is to be extremely flexible, using a number of defined channel bandwidths between 1.25 and 20 MHz, contrasted with UMTS terrestrial radio access (UTRA) fixed 5 MHz channels. Spectral efficiency is increased by up to four-fold compared with UTRA, and improvements in architecture and signalling reduce round-trip latency. Multiple Input/Multiple Output (MIMO) antenna technology should enable 10 times as many users per cell as 3GPP's original WCDMA radio access technology. To suit as many frequency band allocation arrangements as possible, both paired (frequency division duplex FDD) and unpaired (time division duplex TDD) band operation is supported. LTE can co-exist with earlier 3GPP radio technologies, even in adjacent channels, and calls can be handed over to and from all 3GPP's previous radio access technologies.

FIG. 1 illustrates structure of a component carrier in LTE Release 8. The downlink component carrier of the 3GPP LTE Release 8 is sub-divided in the time-frequency domain in so-called sub-frames each of which is divided into two downlink slots 120 corresponding to a time period $T_{slot}$. The first downlink slot comprises a control channel region within the first OFDM symbol(s). Each sub-frame consists of a given number of OFDM symbols in the time domain, each OFDM symbol spanning over the entire bandwidth of the component carrier. The smallest unit of resources that can be assigned by a scheduler is a resource block 130 also called physical resource block (PRB). A PRB 130 is defined as $N_{symb}^{DL}$ consecutive OFDM symbols in the time domain and $N_{sc}^{RB}$ consecutive sub-carriers in the frequency domain. In practice, the downlink resources are assigned in resource block pairs. A resource block pair consists of two resource blocks. It spans $N_{sc}^{RB}$ consecutive sub-carriers in the frequency domain and the entire $2 \cdot N_{symb}^{DL}$ modulation symbols of the sub-frame in the time domain. $N_{symb}^{DL}$ may be either 6 or 7 resulting in either 12 or 14 OFDM symbols in total. Consequently, a physical resource block 130 consists of $N_{symb}^{DL} \times N_{sc}^{RB}$ resource elements 140 corresponding to one slot in the time domain and 180 kHz in the frequency domain (further details on the downlink resource grid can be found, for example, in 3GPP TS 36.211, "Evolved universal terrestrial radio access (E-UTRA); physical channels and modulations (Release 8)", version 8.9.0, December 2009, Section 6.2, available at http://www.3gpp.org. which is incorporated herein by reference).

The number of physical resource blocks $N_{RB}^{DL}$ in downlink depends on the downlink transmission bandwidth configured in the cell and is at present defined in LTE as being from the interval of 6 to 110 PRBs.

The data are mapped onto physical resource blocks by means of pairs of virtual resource blocks. A pair of virtual resource blocks is mapped onto a pair of physical resource blocks. The following two types of virtual resource blocks are defined according to their mapping on the physical resource blocks in LTE downlink:
  Localised Virtual Resource Block (LVRB)
  Distributed Virtual Resource Block (DVRB)

In the localised transmission mode using the localised VRBs, the eNB has full control which and how many resource blocks are used, and should use this control usually to pick resource blocks that result in a large spectral efficiency. In most mobile communication systems, this results in adjacent physical resource blocks or multiple clusters of adjacent physical resource blocks for the transmission to a single user equipment, because the radio channel is coherent in the frequency domain, implying that if one physical resource block offers a large spectral efficiency, then it is very likely that an adjacent physical resource block offers a similarly large spectral efficiency. In the distributed transmission mode using the distributed VRBs, the physical resource blocks carrying data for the same UE are distributed across the frequency band in order to hit at least some physical resource blocks that offer a sufficiently large spectral efficiency, thereby obtaining frequency diversity.

In 3GPP LTE Release 8 there is only one component carrier in uplink and downlink. Downlink control signalling is basically carried by the following three physical channels:
  Physical control format indicator channel (PCFICH) for indicating the number of OFDM symbols used for control signalling in a sub-frame (i.e. the size of the control channel region);
  Physical hybrid ARQ indicator channel (PHICH) for carrying the downlink ACK/NACK associated with uplink data transmission; and
  Physical downlink control channel (PDCCH) for carrying downlink scheduling assignments and uplink scheduling assignments.

The PCFICH is sent from a known position within the control signalling region of a downlink sub-frame using a known pre-defined modulation and coding scheme. The user equipment decodes the PCFICH in order to obtain information about a size of the control signalling region in a sub-frame, for instance, the number of OFDM symbols. If the user equipment (UE) is unable to decode the PCFICH or if it obtains an erroneous PCFICH value, it will not be able to correctly decode the L1/L2 control signalling (PDCCH) comprised in the control signalling region, which may result in losing all resource assignments contained therein.

The PDCCH carries control information, such as, for instance, scheduling grants for allocating resources for downlink or uplink data transmission. A physical control channel is transmitted on an aggregation of one or several consecutive control channel elements (CCEs). Each CCE corresponds to a set of resource elements grouped to so-called resource element groups (REG). A control channel element typically corresponds to 9 resource element groups. A scheduling grant on PDCCH is defined based on control channel elements (CCE). Resource element groups are used for defining the mapping of control channels to resource elements. Each REG consists of four consecutive resource elements excluding reference signals within the same OFDM symbol. REGs exist in the first one to four OFDM symbols within one sub-frame. The PDCCH for the user equipment is transmitted on the first of either one, two or three OFDM symbols according to PCFICH within a sub-frame.

Another logical unit used in mapping of data onto physical resources in 3GPP LTE Release 8 (and later releases) is a resource block group (RBG). A resource block group is a set of consecutive (in frequency) physical resource blocks. The concept of RBG provides a possibility of addressing particular RBGs for the purpose of indicating a position of resources allocated for a receiving node (e.g. UE), in order to minimise the overhead for such an indication, thereby decreasing the control overhead to data ratio for a transmission. The size of RBG is currently specified to be 1, 2, 3, or 4, depending on the system bandwidth, in particular, on $N_{RB}^{DL}$. Further details of RBG mapping for PDCCH in LTE Release 8 may be found in 3*GPP TS* 36.213 *"Evolved Universal terrestrial Radio Access (E-UTRA); Physical layer procedures"*, v8.8.0, September 2009, Section 7.1.6.1, freely available at http://www.3gpp.org/ and incorporated herein by reference.

Physical downlink shared channel (PDSCH) is used to transport user data. PDSCH is mapped to the remaining OFDM symbols within one sub-frame after PDCCH. The PDSCH resources allocated for one UE are in the units of resource block for each sub-frame.

FIG. 2 shows an exemplary mapping of PDCCH and PDSCH within a sub-frame. The first two OFDM symbols form a control channel region (PDCCH region) and are used for L1/L2 control signalling. The remaining twelve OFDM symbols form data channel region (PDSCH region) and are used for data. Within a resource block pairs of all sub-frames, cell-specific reference signals, so-called common reference signals (CRS), are transmitted on one or several antenna ports 0 to 3. In the example of FIG. 2, the CRS are transmitted from two antenna ports: R0 and R1. Moreover, the sub-frame also includes UE-specific reference signals, so-called demodulation reference signals (DM-RS) used by the user equipment for demodulating the PDSCH. The DM-RS are only transmitted within the resource blocks in which the PDSCH is allocated for a certain user equipment. In order to support multiple input/multiple output (MIMO) with DM-RS, four DM-RS layers are defined meaning that at most, MIMO of four layers is supported. In this example, in FIG. 2, DM-RS layer 1, 2, 3 and 4 are corresponding to MIMO layer 1, 2, 3 and 4.

One of the key features of LTE is the possibility to transmit multicast or broadcast data from multiple cells over a synchronized single frequency network which is known as multimedia broadcast single frequency network (MBSFN) operation. In MBSFN operation, UE receives and combines synchronized signals from multiple cells. To facilitate this, UE needs to perform a separate channel estimation based on an MBSFN reference signal. In order to avoid mixing the MBSFN reference signal and normal reference signal in the same sub-frame, certain sub-frames known as MBSFN sub-frames are reserved from MBSFN transmission.

The structure of an MBSFN sub-frame is shown in FIG. 3 up to two of the first OFDM symbols are reserved for non-MBSFN transmission and the remaining OFDM symbols are used for MBSFN transmission. In the first up to two OFDM symbols, PDCCH for uplink resource assignments and PHICH can be transmitted and the cell-specific reference signal is the same as non-MBSFN transmission sub-frames. The particular pattern of MBSFN sub-frames in one cell is broadcasted in the system information of the cell. UEs not capable of receiving MBSFN will decode the first up to two OFDM symbols and ignore the remaining OFDM symbols. MBSFN sub-frame configuration supports both 10 ms and 40 ms periodicity. However, sub-frames with number 0, 4, 5 and 9 cannot be configured as MBSFN sub-frames. FIG. 3 illustrates the format of an MBSFN subframe. The PDCCH information sent on the L1/L2 control signalling may be separated into the shared control information and dedicated control information.

The frequency spectrum for IMT-advanced was decided at the World Radio Communication Conference (WRC-07) in November 2008. However, the actual available frequency bandwidth may differ for each region or country. The enhancement of LTE standardized by 3GPP is called LTE-advanced (LTE-A) and has been approved as the subject matter of Release 10. LTE-A Release 10 employs carrier aggregation according to which two or more component carriers as defined for LTE Release 8 are aggregated in order to support wider transmission bandwidth, for instance, transmission bandwidth up to 100 MHz. More details on carrier aggregation can be found in 3*GPP TS* 36.300 *"Evolved Universal terrestrial Radio Access (E-UTRA) and Universal terrestrial Radio Access Network (E-UTRAN); Overall description"*, v10.2.0, December 2010, Section 5.5 (*Physical layer*), Section 6.4 (*Layer 2*) *and Section* 7.5 (*RRC*), freely available at http://www.3gpp.org/ and incorporated herein by reference. It is commonly assumed that the single component carrier does not exceed a bandwidth of 20 MHz. A terminal may simultaneously receive and/or transmit on one or multiple component carriers depending on its capabilities. A UE may be configured to aggregate a different number of component carriers (CC) in the uplink and in the downlink. The number of downlink CCs which can be configured depends on the downlink aggregation capability of the UE. The number of uplink CCs which can be configured depends on the uplink aggregation capability of the UE. However, it is not possible to configure a UE with more uplink CCs than downlink CCs.

The term "component carrier" is sometimes replaces with the term "cell" since, similar to a concept of a cell known from earlier releases of LTE and UMTS, a component carrier defines resources for transmission/reception of data and may be added/reconfigures/removed from the resources utilized by the wireless nodes (e.g. UE, RN). In particular, a cell is a combination of downlink and optionally uplink resources, i.e. downlink and optional uplink component carrier. In Rel-8/9, there are one carrier frequency of downlink resources and one carrier frequency of uplink resources. The carrier frequency of downlink resources is detected by UE through cell selection procedure. The carrier frequency of uplink resources is informed to UE through System Information Block 2. When carrier aggregation is configured, there are more than one carrier frequency of downlink resources and possibly more than one carrier frequency of uplink resources. Therefore, there would be more than one combination of downlink and optionally uplink resources, i.e. more than one serving cell. The primary serving cell is called Primary Cell (PCell). Other serving cells are called Secondary Cells (SCells).

When carrier aggregation is configured, a UE has only one Radio Resource Control (RRC) connection with the network. Primary Cell (PCell) provides the non-access stratum (NAS) mobility information and security input at RRC connection reestablishment or handover. Depending on UE capabilities, Secondary Cells (SCells) can be configured to form together with the PCell a set of serving cells. RRC connection is the connection between RRC layer on UE side and RRC layer on network side. Establishment, maintenance and release of an RRC connection between the UE and E-UTRAN include: allocation of temporary identifiers between UE and E-UTRAN; configuration of signalling radio bearer(s) for RRC connection, i.e., Low priority SRB and high priority SRB. More details on RRC can be found in 3*GPP TS* 36.331 *"Evolved Universal terrestrial Radio Access (E-UTRA); Radio Resource Control (RRC); Protocol specification"*, v10.0.0, December 2010, freely available at http://www.3gpp.org/ and incorporated herein by reference.

In the downlink, the carrier corresponding to PCell is called Downlink Primary Component Carrier (DL PCC) whereas in the uplink, the carrier corresponding to PCell is called Uplink Primary Component Carrier (UL PCC). The linking between DL PCC and UL PCC is indicated in the system information (System Information Block 2) from the PCell. System information is common control information broadcast by each cell, including, for instance, information about the cell to the terminals. With regard to the system information reception for the PCell, the procedure of LTE in Rel-8/9 applies. The details on system information reception procedure for Rel-8/9 can be found in 3GPP TS 36.331 "Evolved Universal terrestrial Radio Access (E-UTRA); Radio Resource Control (RRC); Protocol specification", v9.5.0, December 2010, Section 5.2, freely available at http://www.3gpp.org/ and incorporated herein by reference. In the downlink, the carrier corresponding to an SCell is a Downlink Secondary Component Carrier (DL SCC) while in the uplink it is an Uplink Secondary Component Carrier (UL SCC). The linking between DL SCC and UL SCC is indicated in the system information (System Information Block 2) of the SCell. All required system information of the SCell is transmitted to UE through dedicated RRC signalling when adding an SCell. Hence, there is no need for the UE to acquire system information directly from SCells. The system information of an SCell remains valid as long as the SCell is configured. Changes in system information of an SCell are handled through the removal and addition of the SCell. Removal and/or addition of an SCell can be performed using an RRC procedure.

Both downlink grant and uplink grant are received on DL CC. Therefore, in order to know the uplink grant received on one DL CC corresponds to the uplink transmission of which UL CC, the linking between DL CC and UL CC would be necessary.

A linking between UL CC and DL CC allows identifying the serving cell for which the grant applies:
  downlink assignment received in PCell corresponds to downlink transmission in the PCell,
  uplink grant received in PCell corresponds to uplink transmission in the PCell,
  downlink assignment received in SCell$_N$ corresponds to downlink transmission in the SCell$_N$,
  uplink grant received in SCell$_N$ corresponds to uplink transmission in the SCell$_N$. If SCell$_N$ is not configured for uplink usage by the UE, the grant is ignored by the UE.

3GPP TS 36.212 v10.0.0, also describes in Section 5.3.3.1 the possibility of cross-carrier scheduling, using a Carrier Indication Field (CIF).

UE may be scheduled over multiple serving cells simultaneously. A cross-carrier scheduling with a CIF allows the PDCCH of a serving cell to schedule resources in another serving cell(s), however, with the following restrictions:
  cross-carrier scheduling does not apply to PCell, which means that PCell is always scheduled via its own PDCCH,
  when the PDCCH of a secondary cell (SCell) is configured, cross-carrier scheduling does not apply to this SCell, which means that the SCell is always scheduled via its own PDCCH, and
  when the PDCCH of an SCell is not configured, cross-carrier scheduling applies and such SCell is always scheduled via PDCCH of another serving cell.

Therefore, if there is no CIF, the linking between DL CC and UL CC identifies the UL CC for uplink transmission; if there is CIF, the CIF value identifies the UL CC for uplink transmission.

The set of PDCCH candidates to monitor, where monitoring implies attempting to decode each of the PDCCHs, are defined in terms of search spaces. A UE not configured with a Carrier Indicator Field (CIF) shall monitor one UE-specific search space at each of the aggregation levels 1, 2, 4, 8 on each activated serving cell. A UE configured with a Carrier Indicator Field (CIF) shall monitor one or more UE-specific search spaces at each of the aggregation levels 1, 2, 4, 8 on one or more activated serving cells. If a UE is configured with a CIF, the UE specific search space is determined by the component carrier, which means that the indices of CCEs corresponding to PDCCH candidates of the search space are determined by the Carrier Indicator Field (CIF) value. The carrier indicator field specifies an index of a component carrier.

If a UE is configured to monitor PDCCH candidates in a given serving cell with a given DCI format size with CIF, the UE shall assume that a PDCCH candidate with the given DCI format size may be transmitted in the given serving cell in any UE specific search space corresponding to any of the possible values of CIF for the given DCI format size. It means that if one given DCI format size can have more than one CIF value, UE shall monitor the PDCCH candidates in any UE specific search spaces corresponding to any possible CIF value with that given DCI format.

Further details on configurations of search spaces with and without CIF as defined in LTE-A for PDCCH can be found in 3*GPP TS* 36.213 *"Evolved Universal terrestrial Radio Access (E-UTRA); Physical Layer procedures"*, v10.0.0, December 2010, Section 9.1.1, freely available at http://www.3gpp.org/ and incorporated herein by reference.

Another key feature of the LTE-A is providing relaying functionality by means of introducing relay nodes to the UTRAN architecture of 3GPP LTE-A. Relaying is considered for LTE-A as a tool for improving the coverage of high data rates, group mobility, temporary network deployment, the cell edge throughput and/or to provide coverage in new areas.

A relay node is wirelessly connected to radio access network via a donor cell. Depending on the relaying strategy, a relay node may be part of the donor cell or, alternatively, may control the cells on its own. In case the relay node is a part of the donor cell, the relay node does not have a cell identity on its own, however, may still have a relay ID. In the case the relay node controls cells on its own, it controls one or several cells and a unique physical layer cell identity is provided in each of the cells controlled by the relay. At least, "type 1" relay nodes will be a part of 3GPP LTE-A. A "type 1" relay node is a relaying node characterized by the following:

- The relay node controls cells each of which appears to a user equipment as a separate cell distinct from the donor cell.
- The cells should have its own physical cell ID as defined in LTE Release 8 and the relay node shall transmit its own synchronization channels, reference symbols etc.
- Regarding the single cell operation, the UE should receive scheduling information and HARQ feedback directly from the relay node and send its controlled information (acknowledgments, channel quality indications, scheduling requests) to the relay node.
- The relay node should appear as a 3GPP LTE compliant eNodeB to 3GPP LTE compliant user equipment in order to support the backward compatibility.
- The relay node should appear differently to the 3GPP LTE eNodeB in order to allow for further performance enhancements to the 3GPP LTE-A compliant user equipments.

FIG. 4 illustrates an example 3GPP LTE-A network structure using relay nodes. A donor eNodeB (d-eNB) 410 directly serves a user equipment UE1 415 and a relay node (RN) 420 which further serves UE2 425. The link between donor eNodeB 410 and the relay node 420 is typically referred to as relay backhaul uplink/downlink. The link between the relay node 420 and user equipment 425 attached to the relay node (also denoted r-UEs) is called (relay) access link.

The donor eNodeB transmits L1/L2 control and data to the micro-user equipment UE1 415 and also to a relay node 420 which further transmits the L1/L2 control and data to the relay-user equipment UE2 425. The relay node may operate in a so-called time multiplexing mode, in which transmission and reception operation cannot be performed at the same time. In particular, if the link from eNodeB 410 to relay node 420 operates in the same frequency spectrum as the link from relay node 420 to UE2 425, due to the relay transmitter causing interference to its own receiver, simultaneous eNodeB-to-relay node and relay node-to-UE transmissions on the same frequency resources may not be possible unless sufficient isolation of the outgoing and incoming signals is provided. Thus, when relay node 420 transmits to donor eNodeB 410, it cannot, at the same time, receive from UEs 425 attached to the relay node. Similarly, when a relay node 420 receives data from donor eNodeB, it cannot transmit data to UEs 425 attached to the relay node. Thus, there is a sub-frame partitioning between relay backhaul link and relay access link.

Regarding the support of relay nodes, in 3GPP it has currently been agreed that:

- Relay backhaul downlink sub-frames during which eNodeB to relay downlink backhaul transmission is configured, are semi-statically assigned.
- Relay backhaul uplink sub-frames during which relay-to-eNodeB uplink backhaul transmission is configured are semi-statically assigned or implicitly derived by HARQ timing from relay backhaul downlink sub-frames.
- In relay backhaul downlink sub-frames, a relay node will transmit to donor eNodeB and consequently r-UEs are not supposed to expect receiving any data from the relay node. In order to support backward compatibility for UEs that are not aware of their attachment to a relay node (such as Release 8 UEs for which a relay node appears to be a standard eNodeB), the relay node configures backhaul downlink sub-frames as MBSFN sub-frames.

Another key feature is the FDD (Frequency Division Duplex) HARQ-ACK procedure. For FDD, if UE detects PDSCH in subframe n−4 intended for the UE and a HARQ-ACK shall be provided, UE shall transmit the HARQ-ACK response in subframe n. The number of HARQ-ACK bits to be transmitted depends on the number of configured serving cells and the downlink transmission mode of each configured cells. If the downlink transmission mode of a serving cell supports up to two transport blocks, two HARQ-ACK bits is used by a UE, otherwise one HARQ-ACK bit.

For FDD, a UE supports at most 2 serving cells shall use PUCCH format 1b with channel selection for transmission of HARQ-ACK when configured with more than one serving cells.

For FDD, a UE that supports more than 2 serving cells use either use PUCCH format 1b with channel selection for PUCCH format 3 for transmission of HARQ-ACK when configured with more than one serving cell.

In case of FDD and one configured cell, the UE shall use PUCCH format 1a/1b to transmit HARQ-ACK. If the downlink transmission mode of the configured serving cell supports up to two transport block, PUCCH format 1b is used, otherwise PUCCH format 1a is used.

The PUCCH resource is determined either by the first CCE index of corresponding PDCCH or by higher layer configuration. If PDSCH transmission is detected with a corresponding PDCCH, the PUCCH resource is determined by the first CCE index of the corresponding PDCCH, otherwise, the PUCCH resource is determined by higher layer configuration.

In case of FDD and the UE being configured with more than one serving cells, the HARQ-ACK is either transmitted using PUCCH format 1b with channel selection or using PUCCH format 3. The detailed information can be found in 3GPP, TS 36.213, "Evolved Universal Terrestrial Radio Access (E-UTRA); Physical layer procedures (Release 10)", freely available at www.3gpp.org and incorporated herein by reference.

Depending on the downlink transmission mode of each configured serving cell, A (A=2, 3, 4) HARQ-ACK bits need to be transmitted. The UE transmits the HARQ-ACK bits using PUCCH format 1b with b(0)b(1) on one PUCCH resource selected from A PUCCH resources. The A PUCCH resources are derived from the first CCE index of corresponding PDCCH or determined from higher layer configuration. The detailed mapping tables are defined in 3GPP, TS 36.213, "Evolved Universal Terrestrial Radio Access (E-UTRA); Physical layer procedures (Release 10)", freely available at www.3gpp.org and incorporated herein by reference.

For FDD, if UE is configured with PUCCH format 3, UE shall transmit HARQ-ACK on one PUCCH resource according to following rules:

- If PDSCH transmission is only detected on primary cell, UE shall use PUCCH format 1a/1b to transmit HARQ-ACK on one PUCCH resource. The PUCCH resource is derived from the first CCE index of corresponding PDCCH or from higher layer configuration.
- If PDSCH transmission is detected on secondary cell, PUCCH format 3 is used to transmit HARQ-ACK on one PUCCH resource. The TPC field in DCI format of the corresponding PDCCH shall be used to determine the PUCCH resource selected from the PUCCH resources configured by higher layer.

For FDD, in PUCCH format 3, HARQ-ACK bits from different configured serving cells are concatenated.

Another key feature is the Enhanced PDCCH (E-PDCCH), which is transmitted based on UE specific reference signal. In order to efficiently use UE specific reference signal, the mapping of enhanced PDCCH is preferred to be allocated in PDSCH region. In order not to blind decode the whole bandwidth, it is assumed that the search space of E-PDCCH would be limited within a set of PRBs. The set of PRBs is first configured by higher layer signalling.

However, in certain scenarios, fast reconfiguration of the search space of E-PDCCH is necessary, for example, if the interference from neighbouring cells change on a timescale of 10 ms. Since E-PDCCH is transmitted in PDSCH region, the interference mainly comes from PDSCH transmission in neighbouring cells. In order to introduce more stable interference pattern to neighbouring cell, it is assumed that the PMI (beam) of neighbouring cells changes in the order of 10 ms. In this case, the flash light interference to E-PDCCH, i.e. the interference from the beam of PDSCH transmission to E-PDCCH, can be avoided by fast reconfiguration of the search space of E-PDCCH in the order of 10 ms. The flashlight interference from neighboring cells is illustrated in FIG. 5.

Another example is a frequency fluctuation dominated scenario, e.g. on low interference subframe of pico cell, fast reconfiguration of the search space of E-PDCCH can achieve better frequency scheduling gain by allocating the search space of E-PDCCH on best PRBs.

Hence, from above scenarios it is apparent that a fast reconfiguration of the search space of E-PDCCH in the order of 10 ms is mandatory.

A straightforward solution is to reconfigure the search space of E-PDCCH by higher layer signalling. This solution, however, has the drawback that higher layer signalling is too slow. The delay of higher layer signalling is in the order of 100 ms, while fast reconfiguration of the search space of E-PDCCH in the order of 10 ms is necessary. Moreover, higher layer signalling has a large overhead. Since the reconfiguration is frequent, using higher layer signalling costs lots of resources.

SUMMARY OF THE INVENTION

In view of the above, an object of the present invention is to provide methods for fast reconfiguration of the search space of E-PDCCH so as to avoid the flashlight interference from neighbouring cells and to allocate the E-PDCCH on the best PRBs in frequency fluctuation dominated scenarios.

This is achieved by the features of independent claims.

Advantageous embodiments of the invention are subject to the dependent claims.

It is the particular approach of the present invention to support transmission of both HARQ-ACK for PDCCH based E-PDCCH reconfiguration and HARQ-ACK for PDSCH on the same UL subframe, so that PDCCH based E-PDCCH reconfiguration and PDSCH can be transmitted on the same sub-frame.

If E-PDCCH is configured for a UE, the following scheme is followed; otherwise, Rel-10 procedures in the specifications are followed. Therefore, it is Rel-10 backward compatible.

If there is no collision between HARQ-ACK for PDCCH based E-PDCCH reconfiguration and HARQ-ACK for PDSCH on the same UL subframe in one serving cell, HARQ-ACK for PDCCH based E-PDCCH reconfiguration is treated similar as HARQ-ACK for PDCCH based SPS deactivation.

If there is collision between HARQ-ACK for PDCCH based E-PDCCH reconfiguration and HARQ-ACK for PDSCH on the same UL subframe in one serving cell, the following procedure is followed:
  If only one serving cell is configured for a UE, the HARQ-ACK for PDCCH based E-PDCCH reconfiguration can be transmitted using the similar scheme as SR (Service Request). If SR also needs to be transmitted on the same UL subframe as HARQ-ACK for PDCCH based E-PDCCH reconfiguration and HARQ-ACK for PDSCH, SR has higher priority over HARQ-ACK for PDCCH based E-PDCCH reconfiguration.
  If two serving cells are configured for a UE, channel selection is used to transmit HARQ-ACK for PDCCH based E-PDCCH reconfiguration and HARQ-ACK for PDSCH. New mapping tables are designed to support transmitting both HARQ-ACK on the same subframe in each configured serving cell. The mapping table is designed in a way that:
    If PDCCH for E-PDCCH reconfiguration is misdetected, the interpretation on UE side would be the same as Rel-10 without PDCCH based E-PDCCH reconfiguration. Therefore, the procedure is fallback compatible with Rel-10, so that there will be no misinterpretation during the procedure of configuring E-PDCCH.
    The carrier aggregation case is fallback compatible with the non carrier aggregation case, so that there will be no misinterpretation during the procedure of reconfiguring the serving cells.

An exemplary embodiment provides a method for providing, by a receiving apparatus configured with at least one serving cell including a primary cell, simultaneous feedback on reconfiguration attempts of search spaces for enhanced physical downlink control channels and feedback on at least one downlink transmission to a transmitting apparatus.

In the method, the receiving apparatus receives said at least one downlink transmission via at least one serving cell from the transmitting apparatus, and receives from the transmitting apparatus reconfiguration information for reconfiguration of the search spaces for at least one serving cell. Then, the receiving apparatus determines for said at least one downlink transmission whether the respective downlink transmission could be decoded successfully, and determines whether the received reconfiguration information could be decoded successfully.

Further, the receiving apparatus generates a feedback tuple including ACK/NACK/DTXs determined based on the successful/un-successful decoding of the at least one downlink transmission and including ACK/DTXs determined based on the successful/un-successful decoding of the reconfiguration information, and transmits the feedback tuple as a combination of:
  a selected one of a plurality of uplink resources available for transmitting the feedback tuple via the primary cell, and
  a selected one of a plurality of modulation symbols of a modulation scheme to be transmitted on the selected uplink resource.

According to an advantageous embodiment of the invention which can be used in addition or alternatively to the above, the feedback tuple is transmitted via the selected uplink resource and using the selected modulation symbol in PUCCH format 1b or PUCCH format 3.

According to an advantageous embodiment of the invention which can be used in addition or alternatively to the above, the number of the plurality of available uplink, PUCCH, resources is larger than the number, A∈{1, 2, 3, 4}, of uplink, PUCCH, resources on the primary cell that correspond to the received downlink, PDSCH, transmissions.

According to an advantageous embodiment of the invention which can be used in addition or alternatively to the above, in case the number of uplink, PUCCH, resources that correspond to the received downlink, PDSCH, transmissions is one, A={1}, the reception of at least one downlink transmission via the primary cell includes reception of at least one transport block, to which a first uplink, PUCCH, resource corresponds.

According to an advantageous embodiment of the invention which can be used in addition or alternatively to the above, the selected uplink, PUCCH, resources is at least one of:
  a first PUCCH resource, defined as PUCCH resource 0, corresponding to the reception of the at least one transport block via the primary cell,
  a second PUCCH resource, defined as PUCCH resource 1, corresponding to the PDCCH for E-PDCCH reconfiguration information received via the primary cell, the second PUCCH resource being derived from the first control channel element, CCE, of the PDCCH for E-PDCCH reconfiguration information, According to an advantageous embodiment of the invention which can be used in addition or alternatively to the above, in case the reception of one downlink transmission via the primary serving cell includes reception of a first transport block, the first position of the feedback tuple, defined as HARQ-ACK(0), indicates a successful/un-successful decoding of the first transport block received via the primary cell, the second position of the feedback tuple, defined as HARQ-ACK(1), indicates a successful/un-successful decoding of the reconfiguration information received via the primary cell.

According to an advantageous embodiment of the invention which can be used in addition or alternatively to the above, in case the reception of one downlink transmission via the primary serving cell includes reception of a first and a second transport block, the first position of the feedback tuple, defined as HARQ-ACK(0), indicates a successful/un-successful decoding of the first transport block received via the primary cell, the second position of the feedback tuple, defined as HARQ-ACK(1), indicates a successful/un-successful decoding of the second transport block received via the primary cell, and the third position of the feedback tuple, defined as HARQ-ACK(2), indicates a successful/un-successful decoding of the reconfiguration information received via the primary cell.

According to an advantageous embodiment of the invention which can be used in addition or alternatively to the above, for the generated feedback tuple of ACK/NACK/DTXs, defined by HARQ-ACK(0), HARQ-ACK(1), or HARQ-ACK(0), HARQ-ACK(1), HARQ-ACK(2), the selection of one of a plurality of uplink, PUCCH, resources and the selection of one of a plurality of modulation symbols, defined by (0,0) or (0,1) or (1,0) or (1,1), is based on a feedback mapping rule such that
  the transmission of the generated feedback tuple of ACK/NACK/DTXs is performed on the first PUCCH resource, in case the decoding of the received reconfiguration information is successful, and that the transmission of the generated feedback tuple of ACK/NACK/DTXs is performed on the second PUCCH resource, in case the decoding of the reconfiguration information is un-successful.

According to an advantageous embodiment of the invention which can be used in addition or alternatively to the above, in case the number of uplink, PUCCH, resources that correspond to the received downlink, PDSCH, transmissions is two, A={2}, the reception of at least one downlink transmission via a first serving cell includes reception of a first transport block, and the reception of at least one downlink transmission via a second serving cell includes reception of a second transport block.

According to an advantageous embodiment of the invention which can be used in addition or alternatively to the above, the selected uplink, PUCCH, resources is at least one of:
  a first PUCCH resource, defined as PUCCH resource 0, corresponding to the reception of the first transport block via the first serving cell,
  a second PUCCH resource, defined as PUCCH resource 1, corresponding to the PDCCH for E-PDCCH reconfiguration information received via the first serving cell, the second PUCCH resource being derived from the first control channel element, CCE, of the PDCCH for E-PDCCH reconfiguration information,
  a third PUCCH resource, defined as PUCCH resource 2, corresponding to the reception of the second transport block via the second serving cell,
  a fourth PUCCH resource, defined as PUCCH resource 3, corresponding to the PDCCH for E-PDCCH reconfiguration information received via the second serving cell, the fourth PUCCH resource being chosen by a transmit power control, TPC, field of the PDCCH for E-PDCCH from higher layer configured PUCCH resources.

According to an advantageous embodiment of the invention which can be used in addition or alternatively to the above, the first position of the generated feedback tuple, defined as HARQ-ACK(0), indicates a successful/un-successful decoding of the first transport block received via the first serving cell, the second position of the feedback tuple, defined as HARQ-ACK(1), indicates a successful/un-successful decoding of the reconfiguration information received via the first serving cell, the third position of the feedback tuple, defined as HARQ-ACK(2), indicates a successful/un-successful decoding of the second transport block received via the second serving cell, and the fourth position of the feedback tuple, defined as HARQ-ACK(3), indicates a successful/un-successful decoding of the reconfiguration information received via the second serving cell.

According to an advantageous embodiment of the invention which can be used in addition or alternatively to the above, for the generated feedback tuple of ACK/NACK/DTXs, defined by HARQ-ACK(0), HARQ-ACK(1), HARQ-ACK(2), HARQ-ACK(3), the selection of one of a plurality of uplink, PUCCH, resources and the selection of one of a plurality of modulation symbols, defined by (0,0) or (0,1) or (1,0) or (1,1), is based on a feedback mapping rule such that:
  in case the decoding of the received reconfiguration information is un-successful, the generated feedback tuple of ACK/NACK/DTXs is transmitted either via the first PUCCH resource or via the third PUCCH resource, and in this case,
    if the first transport block via the first serving cell is decoded successfully and the PDCCH corresponding to the second transport block via the second serving cell is decoded un-successfully or the second transport block via the second serving cell is decoded un-successfully, the modulation symbol (1,1) is selected as modulation scheme to be transmitted via the first PUCCH resource;
    if the first transport block via the first serving cell is decoded un-successfully and the PDCCH corresponding to the second transport block via the second serving cell is decoded un-successfully or the second transport block via the second serving cell is decoded un-successfully, the modulation symbol (0,0) is selected as modulation scheme to be transmitted via the first PUCCH resource;

if the first transport block via the first serving cell is decoded successfully and the second transport block via the second serving cell is also decoded successfully, the modulation symbol (1,1) is selected as modulation scheme to be transmitted via the third PUCCH resource;

if the PDCCH corresponding to the first transport block via the first serving cell is decoded un-successfully or the first transport block via the first serving cell is decoded un-successfully and the second transport block via the second serving cell is decoded successfully, the modulation symbol (0,0) is selected as modulation scheme to be transmitted via the third PUCCH resource, According to an advantageous embodiment of the invention which can be used in addition or alternatively to the above, in case the decoding of the second transport block received via the second serving cell is un-successful and the reconfiguration information received via the second serving cell is un-successful, the generated feedback tuple of ACK/NACK/DTXs is transmitted either via the first PUCCH resource or the second PUCCH resource, and in this case, if the first transport block via the first serving cell is decoded successfully and the reconfiguration information via the second serving cell is decoded un-successfully, the modulation symbol (1,1) is selected as modulation scheme to be transmitted via the first PUCCH resource;

if the first transport block via the first serving cell is decoded un-successfully and the reconfiguration information via the second serving cell is decoded un-successfully, the modulation symbol (0,0) is selected as modulation scheme to be transmitted via the first PUCCH resource;

if the first transport block via the first serving cell is decoded successfully and the reconfiguration information via the second serving cell is also decoded successfully, the modulation symbol (1,1) is selected as modulation scheme to be transmitted via the second PUCCH resource;

if the PDCCH corresponding to the first transport block via the first serving cell is decoded un-successfully or the first transport block via the first serving cell is decoded un-successfully and the second transport block via the second serving cell is decoded successfully, the modulation symbol (0,0) is selected as modulation scheme to be transmitted via the second PUCCH resource, According to an advantageous embodiment of the invention which can be used in addition or alternatively to the above, in case the PDCCH corresponding to the first transport block or the PDCCH corresponding to the second transport block is decoded un-successfully, the respective first or third PUCCH resource is excluded from selection for transmission of the generated feedback tuple of ACK/NACK/DTXs and/or in case the decoding of reconfiguration information received via the first or second serving cell is un-successful, the second PUCCH resource or the fourth PUCCH resource is excluded from selection for transmission of the generated feedback tuple of ACK/NACK/DTXs.

According to an advantageous embodiment of the invention which can be used in addition or alternatively to the above, the feedback mapping rule corresponds to Table 2 of the description below.

According to an advantageous embodiment of the invention which can be used in addition or alternatively to the above, in case the number of uplink, PUCCH, resources that correspond to the received downlink, PDSCH, transmissions is three, A={3}, the reception of at least one downlink transmission via a first serving cell includes reception of a first and a second transport block, and the reception of at least one downlink transmission via a second serving cell includes reception of a third transport block.

According to an advantageous embodiment of the invention which can be used in addition or alternatively to the above, the selected uplink resources is at least one of:

a first PUCCH resource, defined as PUCCH resource 0, corresponding to the reception of the first transport block via the first serving cell, a second PUCCH resource, defined as PUCCH resource 1, corresponding to the reception of the second transport block via the first serving cell, a third PUCCH resource, defined as PUCCH resource 2, corresponding to the reception of the third transport block via the second serving cell, a fourth PUCCH resource, also defined as PUCCH resource 1, corresponding to the PDCCH for E-PDCCH reconfiguration information received via the first serving cell, the fourth PUCCH resource being derived from the first control channel element, CCE, of the PDCCH for E-PDCCH reconfiguration information, a fifth PUCCH resource, also defined as PUCCH resource 3, corresponding to the PDCCH for E-PDCCH reconfiguration information received via the second serving cell, the fifth PUCCH resource being chosen by a transmit power control, TPC, field of the PDCCH for E-PDCCH from higher layer configured PUCCH resources.

According to an advantageous embodiment of the invention which can be used in addition or alternatively to the above, wherein, in case the decoding of the received PDCCH indicating the first and second transport block for the first serving cell is successful and the decoding of the via the first serving cell received reconfiguration information is un-successful, then the selection of one of a plurality of available uplink resources is performed among the first PUCCH resource, the second PUCCH resource, and at least one of the third and fifth PUCCH resource, and the second position of the feedback tuple, defined as HARQ-ACK(1), indicates the successful/un-successful decoding of the second transport block, or otherwise the selection of one of a plurality of available uplink resources is performed among the first PUCCH resource, at least one of the third and fifth PUCCH resource, and the fourth PUCCH resource, and the second position of the feedback tuple, defined as HARQ-ACK(1), indicates the successful/un-successful decoding of the reconfiguration information received via the first serving cell.

According to an advantageous embodiment of the invention which can be used in addition or alternatively to the above, the first position of the feedback tuple, defined as HARQ-ACK(0), indicates a successful/un-successful decoding of the first transport block received via the first serving cell, and the third position of the feedback tuple, defined as HARQ-ACK(2), indicates a successful/un-successful decoding of the third transport block received via the second serving cell, and the fourth position of the feedback tuple, defined as HARQ-ACK(3), indicates a successful/un-successful decoding of the reconfiguration information received via the second serving cell.

According to an advantageous embodiment of the invention which can be used in addition or alternatively to the above, for the generated feedback tuple of ACK/NACK/DTXs, defined by HARQ-ACK(0), HARQ-ACK(1), HARQ-ACK(2), HARQ-ACK(3), the selection of one of a plurality of uplink, PUCCH, resources and the selection of one of a plurality of modulation symbols, defined by (0,0) or (0,1) or (1,0) or (1,1), is based on a feedback mapping rule corresponding to Table 4 of the description below.

According to an advantageous embodiment of the invention which can be used in addition or alternatively to the above, in case the number of uplink, PUCCH, resources that correspond to the received downlink, PDSCH, transmissions is four, A={4}, the reception of at least one downlink transmission via a first serving cell includes reception of a first and a second transport block to which a first and a second uplink, PUCCH, resource correspond, and the reception of at least one downlink transmission via a second serving cell includes reception of a third and fourth transport block to which a third and fourth uplink, PUCCH, resources correspond.

According to an advantageous embodiment of the invention which can be used in addition or alternatively to the above, the selected uplink resources is at least one of:
- a first PUCCH resource, defined as PUCCH resource 0, corresponding to the reception of the first transport block via the first serving cell,
- a second PUCCH resource, defined as PUCCH resource 1, corresponding to the reception of the second transport block via the first serving cell,
- a third PUCCH resource, defined as PUCCH resource 2, corresponding to the reception of the third transport block via the second serving cell,
- a fourth PUCCH resource, defined as PUCCH resource 3, corresponding to the reception of the fourth transport block via the second serving cell,
- a fifth PUCCH resource, also defined as PUCCH resource 1, corresponding to the PDCCH for E-PDCCH reconfiguration information received via the first serving cell, the fourth PUCCH resource being derived from the first control channel element, CCE, of the PDCCH for E-PDCCH reconfiguration information,
- a sixth PUCCH resource, also defined as PUCCH resource 3, corresponding to the PDCCH for E-PDCCH reconfiguration information received via the second serving cell, the fifth PUCCH resource being chosen by a transmit power control, TPC, field of the PDCCH for E-PDCCH from higher layer configured PUCCH resources.

According to an advantageous embodiment of the invention which can be used in addition or alternatively to the above,
- in case the decoding of the received PDCCH indicating first and second transport block for the first serving cell is successful and the decoding of the via the first serving cell received reconfiguration information is un-successful, the selection of one of a plurality of available uplink resources is performed among the first PUCCH resource, the second PUCCH resource, the third PUCCH resource and either the fourth or the sixth PUCCH resource, and the second position of the feedback tuple, defined as HARQ-ACK(1), indicates the successful/un-successful decoding of the second transport block, or
- otherwise the selection of one of a plurality of available uplink resources is performed among the first uplink PUCCH resource, the third PUCCH resource, the fifth PUCCH resource and either the fourth or the sixth PUCCH resource and the second position of the feedback tuple, defined as HARQ-ACK(1), indicates the successful/un-successful decoding of the reconfiguration information received via the first serving cell, and
- in case the decoding of the received PDCCH indicating third and fourth transport block for the second serving cell is successful and the decoding of the via the second serving cell received reconfiguration information is un-successful, the selection of one of a plurality of available uplink resources is performed among the first PUCCH resource, either the second or the fifth PUCCH resource, the third PUCCH resource and the fourth PUCCH resource, and the fourth position of the feedback tuple, defined as HARQ-ACK(3), indicates the successful/un-successful decoding of the fourth transport block, or
- otherwise the selection of one of a plurality of available uplink resources is performed among the first uplink PUCCH resource, either the second or the fifth PUCCH resource, the third PUCCH resource and the sixth PUCCH resource and the fourth position of the feedback tuple, defined as HARQ-ACK(3), indicates the successful/un-successful decoding of the reconfiguration information received via the second serving cell.

According to an advantageous embodiment of the invention which can be used in addition or alternatively to the above, the first position of the feedback tuple, defined as HARQ-ACK(0), indicates a successful/un-successful decoding of the first transport block received via the first serving cell, and the third position of the feedback tuple, defined as HARQ-ACK(2), indicates a successful/un-successful decoding of the third transport block received via the second serving cell.

According to an advantageous embodiment of the invention which can be used in addition or alternatively to the above, the selection of one of a plurality of uplink, PUCCH, resources and the selection of one of a plurality of modulation symbols, defined by (0,0) or (0,1) or (1,0) or (1,1) for the generated feedback tuple of ACK/NACK/DTXs, defined by HARQ-ACK(0), HARQ-ACK(1), HARQ-ACK(2), HARQ-ACK(3) is based on a feedback mapping rule corresponding to Table 4 of the description below.

The present invention further provides a receiving apparatus for providing to a transmitting apparatus simultaneous feedback on a reconfiguration attempt of a search space for an enhanced physical downlink control channel and feedback on at least one downlink transmission. The receiving apparatus being configured with at least one serving cell including a primary cell and comprises a receiver, a processor and a transmitter.

The receiver of the receiving apparatus is adapted to receive said at least one downlink transmission via at least one serving cell from the transmitting apparatus, and adapted to receive from the transmitting apparatus reconfiguration information for reconfiguration of the search spaces for at least one serving cell, The processor of the receiving apparatus is adapted to determine for said at least one downlink transmission whether the respective downlink transmission could be decoded successfully, and adapted to determine whether the received reconfiguration information could be decoded successfully. The processor is further adapted to generate a feedback tuple including ACK/NACK/DTXs determined based on the successful/un-successful decoding of the at least one downlink transmission and including ACK/DTXs determined based on the successful/un-successful decoding of the reconfiguration information.

The transmitter of the receiving apparatus is adapted to transmit the feedback tuple as a combination of:
   a selected one of a plurality of uplink resources available for transmitting the feedback tuple via the primary cell, and
   a selected one of a plurality of modulation symbols of a modulation scheme to be transmitted on the selected uplink resource.

According to an advantageous embodiment of the invention which can be used in addition or alternatively to the above, the processor of the receiving apparatus is adapted to perform the method for providing simultaneous feedback on a reconfiguration attempt of a search space for an enhanced physical downlink control channel and feedback on at least one downlink transmission according to one of the various exemplary embodiments described herein.

A further embodiment of the invention is providing a computer readable medium storing instructions that, when executed by a processor of a receiving apparatus, cause the receiving apparatus configured with at least one serving cell, to provide simultaneous feedback on a reconfiguration attempt of a search space for an enhanced physical downlink control channel and feedback on at least one downlink transmission to a transmitting apparatus by receiving said at least one downlink transmission via at least one serving cell from the transmitting apparatus, by receiving from the transmitting apparatus reconfiguration information for reconfiguration of the search spaces for at least one serving cell, by determining for said at least one downlink transmission whether the respective downlink transmission could be decoded successfully, and determining whether the received reconfiguration information could be decoded successfully, by generating a feedback tuple including ACK/NACK/DTXs determined based on the successful/un-successful decoding of the at least one downlink transmission and including ACK/DTXs determined based on the successful/un-successful decoding of the reconfiguration information, and by transmitting the feedback tuple as a combination of:
   a selected one of a plurality of uplink resources available for transmitting the feedback tuple via the primary cell, and
   a selected one of a plurality of modulation symbols of a modulation scheme to be transmitted on the selected uplink resource.

The above and other objects and features of the present invention will become more apparent from the following description and preferred embodiments given in conjunction with the accompanying drawings in which:

FIG. 3 is a schematic drawing illustrating a structure of MBSFN sub-frames and a physical resource block pair thereof defined for 3GPP LTE Release 8 and 3GPP LTE-A Release 10;

FIG. 6 shows an example of the PDCCH based E-PDCCH reconfiguration procedure;

FIG. 7 illustrates the problem of supporting both PDCCH based E-PDCCH reconfiguration and PDSCH on the same subframe;

FIG. 14 shows the A=4 mapping of Rel-10.

FIG. 15 shows an example of an A=1 mapping supporting one transport block according to an embodiment of the present invention;

FIG. 16 shows an example of an A=1 mapping supporting up to two transport blocks according to an embodiment of the present invention.

DETAILED DESCRIPTION

Figure 1:
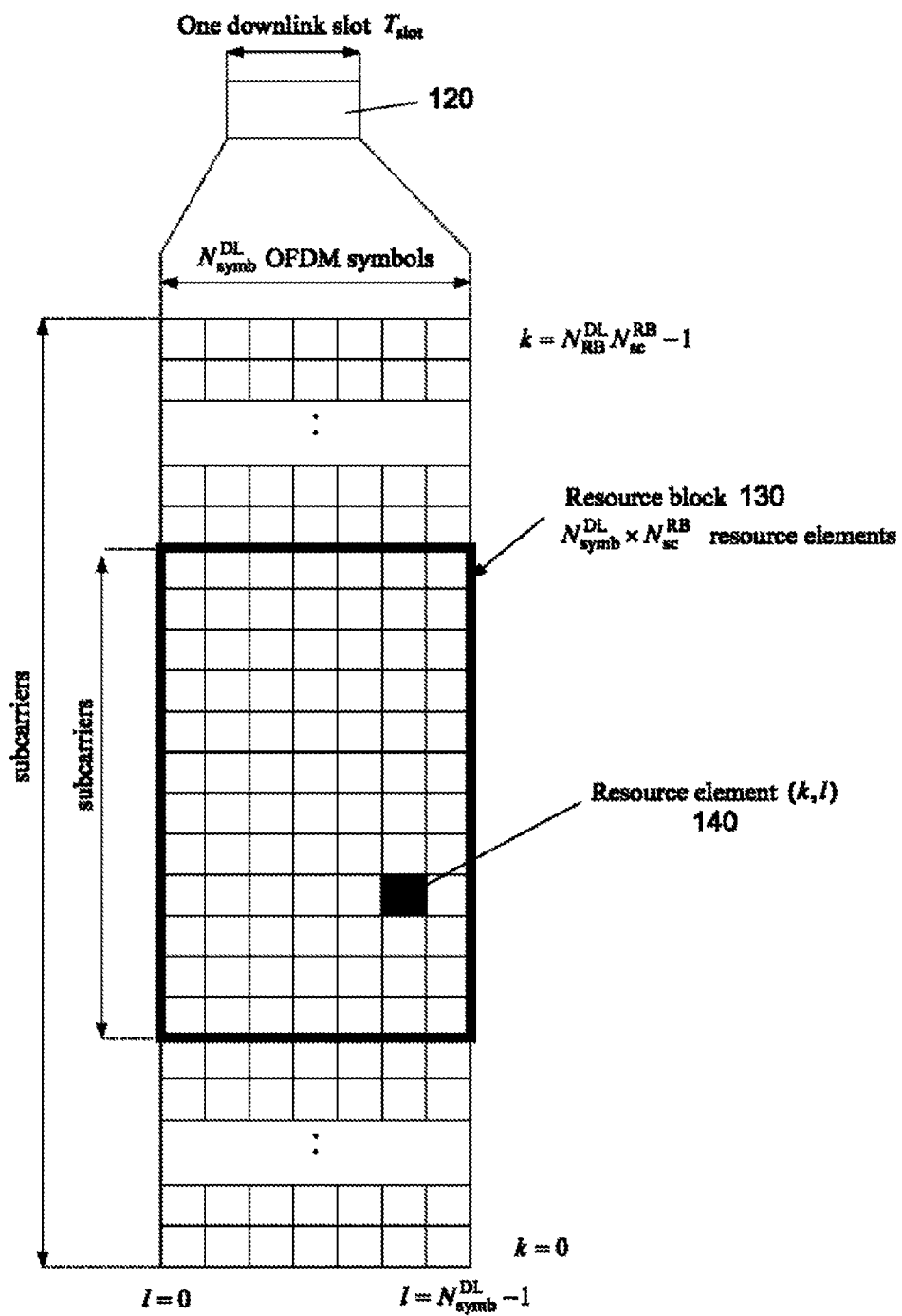
FIG. 1 is a schematic drawing showing an exemplary downlink component carrier of one of two downlink slots of a sub-frame defined for 3GPP LTE release 8.
Figure 2:
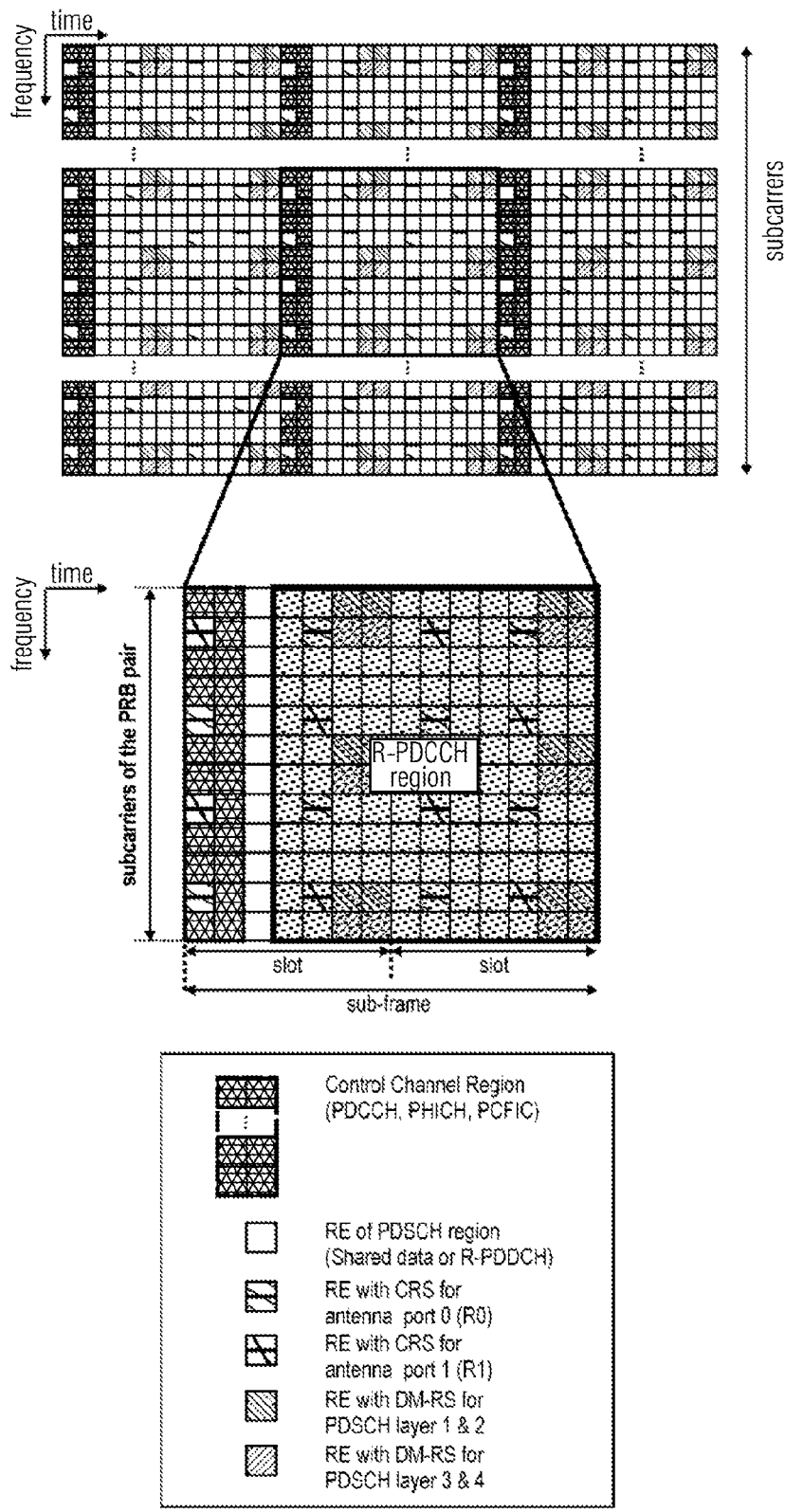
FIG. 2 is a schematic drawing illustrating the structure of a non-MBSFN sub-frames and a physical resource block pair thereof defined for 3GPP LTE release 8 and 3GPP LTE-a release 10.
Figure 4:
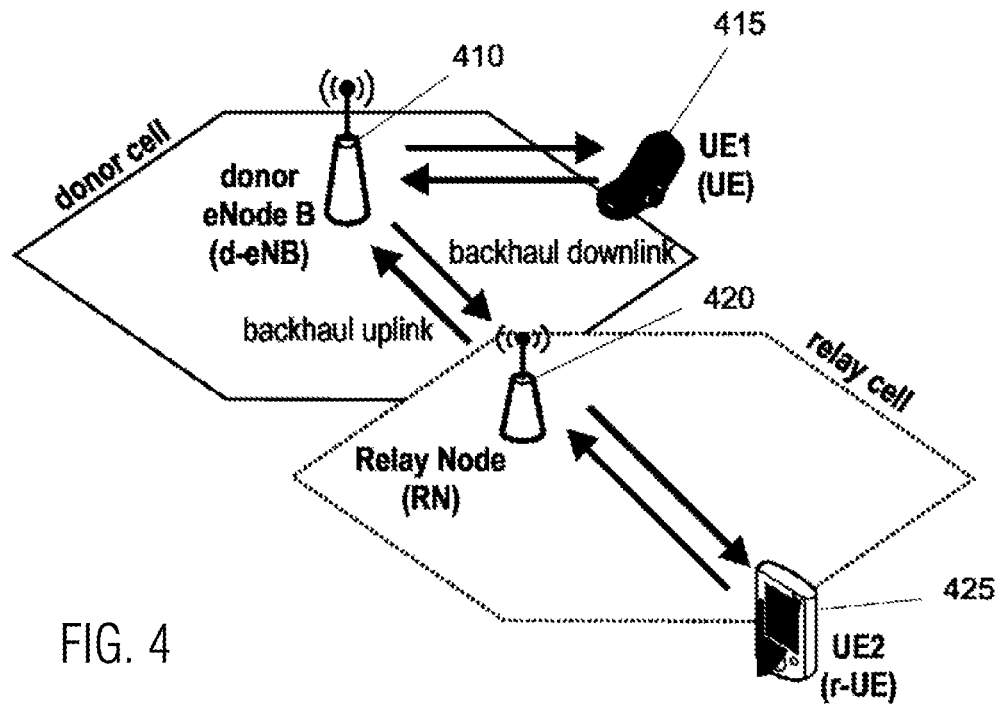
FIG. 4 is a schematic drawing of an exemplary network configuration including a donor eNodeB, a relay node, and two user equipments.
Figure 5:
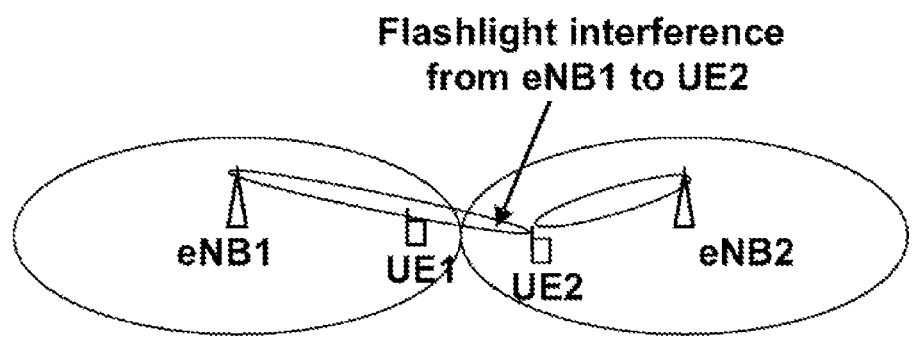
FIG. 5 is a schematic illustration of the flashlight interference from neighboring cells.

The aim of the present invention is to achieve a fast reconfiguration of the search space of E-PDCCH so as to avoid the flashlight interference from neighboring cells and to allocate the E-PDCCH on the best PRBs in frequency fluctuation dominated scenarios.

In general, for reconfiguration of the search space of E-PDCCH through PDCCH, there are two options:

Option 1: change the DCI format of DL assignment to include E-PDCCH reconfiguration. The drawback of this option is that it would cause lots of PDCCH overhead because of the reconfiguration.

Option 2: create new DCI format for the reconfiguration of E-PDCCH or use another C-RNTI for receiving the corresponding PDCCH for E-PDCCH reconfiguration. It would cause more blind decoding, but it is more efficient than Option 1.

In this idea, UE starts to blind decode the corresponding PDCCH for E-PDCCH reconfiguration on every subframe after E-PDCCH is configured for a certain UE by higher layer signalling. If UE detects the corresponding PDCCH for E-PDCCH reconfiguration on DL subframe #n, UE will transmit ACK on UL subframe #(n+4). Otherwise, nothing is transmitted on UL subframe #(n+4). Corresponding PUCCH resource for ACK transmission is determined from the first CCE index of the corresponding PDCCH for E-PDCCH reconfiguration.

The resources allocated by the corresponding PDCCH for E-PDCCH reconfiguration on subframe #n are used as new search space for E-PDCCH starting from subframe #(n+k). k considers the time for eNB to detect the feedback of the corresponding PDCCH for E-PDCCH reconfiguration and eNB scheduling time.

An example of the procedure is shown in FIG. 6. In this example, the corresponding PDCCH for E-PDCCH reconfiguration is correctly received by UE on DL subframe #2. UE transmits ACK on corresponding PUCCH resource on UL subframe #6. Starting from DL subframe #10, the new search space is used for blind decoding E-PDCCH for this UE. In the example, k=8.

The benefits of this idea are that PDCCH based E-PDCCH reconfiguration is much faster, namely in the order of 10 ms. Further, the overhead of PDCCH based E-PDCCH reconfiguration is much smaller compared with higher layer signalling, especially when the reconfiguration is frequent.

However, the problem of this idea is that on the subframe, where PDCCH based E-PDCCH reconfiguration is transmitted, no PDSCH can be transmitted on the same subframe in the same serving cell. Otherwise, more HARQ-ACK bits would need to be transmitted. According to current specification TS36.213, the number of HARQ-ACK bits for each configured serving cell is determined by the downlink transmission mode configured for the serving cell. If the downlink transmission mode of the configured serving cell supports up to two transport blocks, 2 HARQ-ACK bits need to be transmitted, otherwise, 1 HARQ-ACK bit. If PDSCH and PDCCH based E-PDCCH reconfiguration are transmitted on the same subframe, 3 HARQ-ACK bits would need to be transmitted for downlink transmission mode supporting up to two transport block; and 2 HARQ-ACK bits would need to be transmitted for downlink transmission mode supporting at most one transport block.

An example of the problem is shown in FIG. 7. In this figure, both PDCCH based E-PDCCH reconfiguration and PDCCH and corresponding PDSCH are transmitted on DL subframe #2. On UL subframe #6, both HARQ-ACK for PDCCH based E-PDCCH reconfiguration and HARQ-ACK for PDSCH need to be transmitted on UL subframe #6. But current specification only supports transmission of the HAQR-ACK for PDCCH based E-PDCCH reconfiguration or the HARQ-ACK for PDSCH on UL subframe #6.

In view of this problem the exemplary embodiments of the invention are provided.

First Embodiment

This is achieved by supporting a transmission of both HARQ-ACK for PDCCH based E-PDCCH reconfiguration and HARQ-ACK for PDSCH on the same UL subframe, so that PDCCH based E-PDCCH reconfiguration and PDSCH can be transmitted on the same subframe. Specifically, if E-PDCCH is not configured for a UE, Rel-10 procedures are followed. If E-PDCCH is configured for a UE, the following new scheme is followed.

For a serving cell, if only HARQ-ACK for PDCCH based E-PDCCH reconfiguration or HARQ-ACK for PDSCH needs to be transmitted on one UL subframe, HARQ-ACK for PDCCH based E-PDCCH reconfiguration is treated similar as HARQ-ACK for PDCCH based deactivation. The detailed procedure is as follows:

If only one serving cell is configured, HARQ-ACK for PDCCH based E-PDCCH reconfiguration or HARQ-ACK for PDSCH is transmitted on their corresponding PUCCH resource. PUCCH resource of HARQ-ACK for PDCCH based E-PDCCH reconfiguration is determined by the first CCE index of corresponding PDCCH for E-PDCCH reconfiguration. PUCCH resource of HARQ-ACK for PDSCH is determined by the first CCE index of corresponding PDCCH for PDSCH.

If more than one serving cell is configured, PUCCH format 1b with channel selection is used or PUCCH format 3 is used depending on configuration.

If only one serving cell is configured for a UE and there is a collision between HARQ-ACK for PDCCH based E-PDCCH reconfiguration and HARQ-ACK for PDSCH, the following procedure is followed:

If only one serving cell is configured for a UE and there is collision between HARQ-ACK for PDCCH based E-PDCCH reconfiguration and HARQ-ACK for PDSCH, channel selection is used to support a transmission of both HARQ-ACK for PDCCH based E-PDCCH reconfiguration and HARQ-ACK for PDSCH on one subframe for the serving cell. If HARQ-ACK(j) is defined as the HARQ-ACKs to be transmitted using PUCCH format 1b with channel selection, the mapping between HARQ-ACK(j) and transport block of PDSCH and PDCCH based E-PDCCH reconfiguration is as follows:

If only one transport block is supported for the serving cell, HARQ-ACK(0) corresponds to HARQ-ACK for the transport block in the serving cell, HARQ-ACK(1) corresponds to HARQ-ACK for PDCCH based E-PDCCH reconfiguration in the serving cell;

If up to two transport blocks are supported for the serving cell, HARQ-ACK(0) corresponds to HARQ-ACK for the first transport block in the serving cell, HARQ-ACK(1) corresponds to HARQ-ACK for the second transport block in the serving cell, HARQ-ACK(2) corresponds to HARQ-ACK for PDCCH based E-PDCCH reconfiguration in the serving cell.

Moreover, PUCCH resource 0 is the PUCCH resource that corresponds to the transport block of the serving cell, PUCCH resource 1 is the PUCCH resource that corresponds to PDCCH for E-PDCCH reconfiguration.

The mapping of the HARQ-ACK(j) value and b(0)b(1) in PUCCH format 1b and the PUCCH resource used for transmission is performed according to the following rule:

If PDCCH for E-PDCCH reconfiguration is successfully detected, HARQ-ACK(j) values are mapped to PUCCH resource 1;

Otherwise, HARQ-ACK(j) values are mapped to PUCCH resource 0.

An example of the mapping of only one supported transport block according to an embodiment of the present invention is illustrated in FIG. 15. An example of the mapping of up to two supported transport blocks according to an embodiment of the present invention is illustrated in FIG. 16.

If two serving cells are configured for a UE and there is collision between HARQ-ACK for PDCCH based E-PDCCH reconfiguration and HARQ-ACK for PDSCH, channel selection is used to support a transmission of both HARQ-ACK for PDCCH based E-PDCCH reconfiguration and HARQ-ACK for PDSCH on one subframe for each configured serving cell. If HARQ-ACK(j) is defined as the HARQ-ACKs to be transmitted using PUCCH format 1b with channel selection, the mapping between HARQ-ACK(j) and transport block of PDSCH and PDCCH based E-PDCCH reconfiguration is given in Table 1. In this table, A denotes the number of PUCCH resources that can be derived from the PDSCH transmission.

In detail, control signaling on the PUCCH is transmitted in a frequency region at the edge of the system bandwidth via the primary cell. For minimizing the resources required for control signaling, each transmission on the PUCCH is performed in two resource blocks of a subframe, a first resource block is in a first slot of the subframe and a second resource block is in a second slot of the subframe. The two resource blocks are transmitted at opposite edges of the system bandwidth. Both resource blocks for a PUCCH transmission are referred to as PUCCH resource or PUCCH region. Depending on the system bandwidth, between 1 and 16 PUCCH resources can be utilized.

The PUCCH resources used for channel selection are ordered according to the ascending order of j. The PUCCH resource that corresponds to PDCCH based E-PDCCH reconfiguration transmitted in primary cell is derived from the first CCE index of the PDCCH for E-PDCCH reconfiguration. The PUCCH resource that corresponds to PDCCH based E-PDCCH reconfiguration transmitted in secondary cell is chosen from the configured PUCCH resources by TPC field in the PDCCH for E-PDCCH reconfiguration.

TABLE 1

Mapping of Transport Block and E-PDCCH reconfiguration
and Serving Cell to HARQ-ACK(j)

| A | HARQ-ACK(0) | HARQ-ACK(1) | HARQ-ACK(2) | HARQ-ACK(3) |
|---|---|---|---|---|
| 2 | TB1 Primary cell | E-PDCCH reconfig Primary cell | TB1 Secondary cell | E-PDCCH reconfig Secondary cell |
| 3 | TB1 Serving cell1 | TB2/E-PDCCH reconfig Serving cell1 | TB3 Serving cell2 | E-PDCCH reconfig Serving cell2 |
| 4 | TB1 Serving cell1 | TB2/E-PDCCH reconfig Serving cell1 | TB3 Serving cell2 | TB4/E-PDCCH reconfig Serving cell2 |

In case of A=2, only one transport block is supported for each configured serving. HARQ-ACK(0) corresponds to the HARQ-ACK for the transport block received via the primary cell, HARQ-ACK(1) corresponds to the HARQ-ACK for PDCCH based E-PDCCH reconfiguration received via the primary cell, HARQ-ACK(2) corresponds to the HARQ-ACK for the transport block received via the secondary cell, and HARQ-ACK(3) corresponds to the HARQ-ACK for PDCCH based E-PDCCH reconfiguration received via the secondary cell. Moreover, PUCCH resource 0 is the PUCCH resource that corresponds to the transport block of the primary cell, PUCCH resource 2 is the PUCCH resource that corresponds to the transport block of the secondary cell, and so on.

In case of A=2, the mapping of the HARQ-ACK(j) value and $b(0)b(1)$ in PUCCH format 1b and the PUCCH resource used for transmission is performed according to the following rules:

It is fallback compatible with A=2 of Rel-10, i.e. if no PDCCH for E-PDCCH reconfiguration is detected by a UE on one subframe, the interpretation of the HARQ-ACK values is the same as if no E-PDCCH was configured. The benefit of this rule is that during the procedure of E-PDCCH configuration, there is no misinterpretation of HARQ-ACK values.

It is fallback compatible with the non carrier aggregation (CA) case with configured E-PDCCH, i.e. if no PDSCH and no PDCCH for E-PDCCH reconfiguration are detected in the secondary cell, the interpretation of the HARQ-ACK values is the same as in the non-CA case. The benefit of this rule is that during the procedure of serving cell reconfiguration, there is no misinterpretation of HARQ-ACK values.

A certain PUCCH resource is used only when corresponding PDCCH/PDSCH is detected, e.g. PUCCH resource 1 and PUCCH resource 3 are only used when PDCCH for E-PDCCH reconfiguration is detected on the corresponding serving cell. This rule is necessary because the PUCCH resource is derived from the corresponding PDCCH. If PDCCH is not detected, the PUCCH resource would be unknown.

Figure 8:
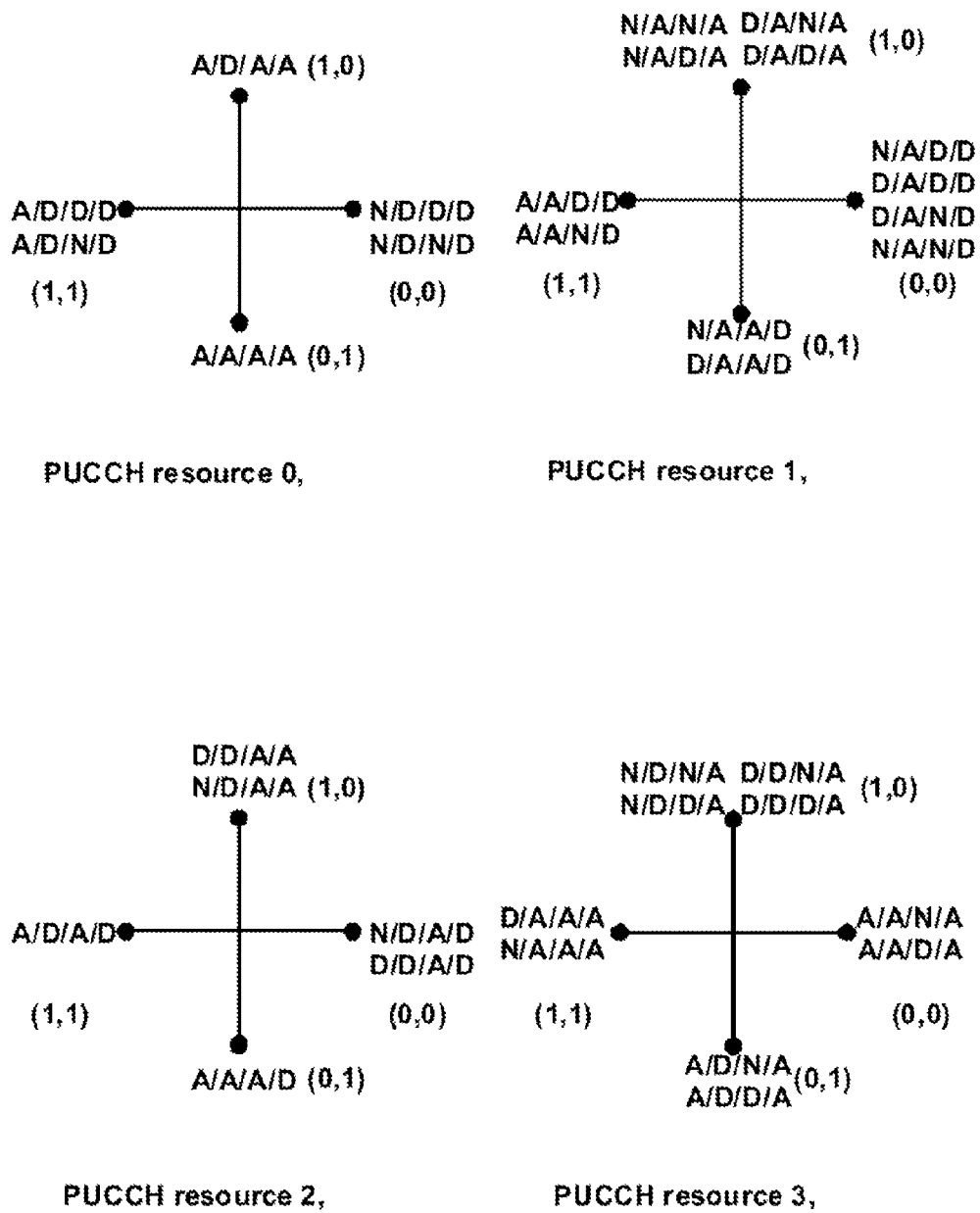
FIG. 8 shows an example of an A=2 mapping according to an embodiment of the present invention.
Figure 9A:
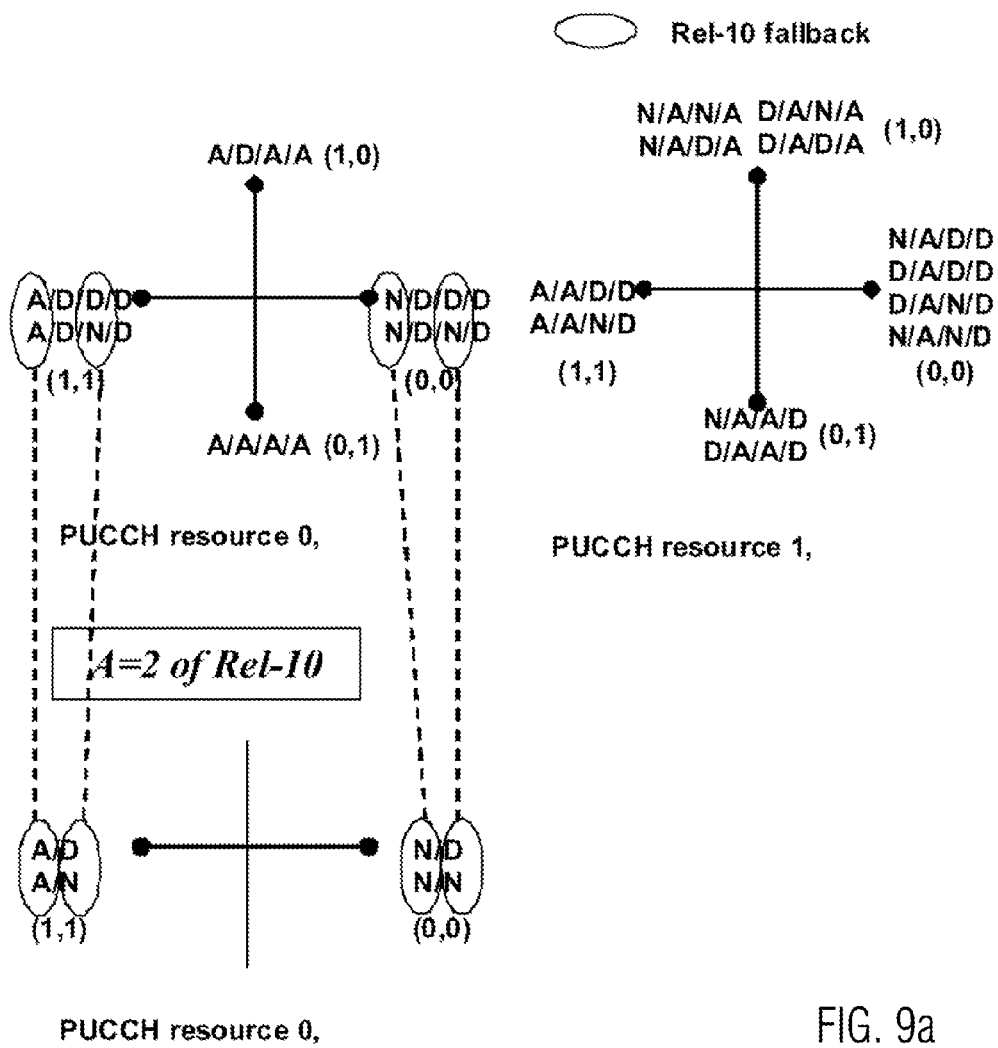
FIG. 9 shows a comparison of the A=2 mapping of FIG. 8 and the A=2 mapping of Rel-10.
Figure 9B:
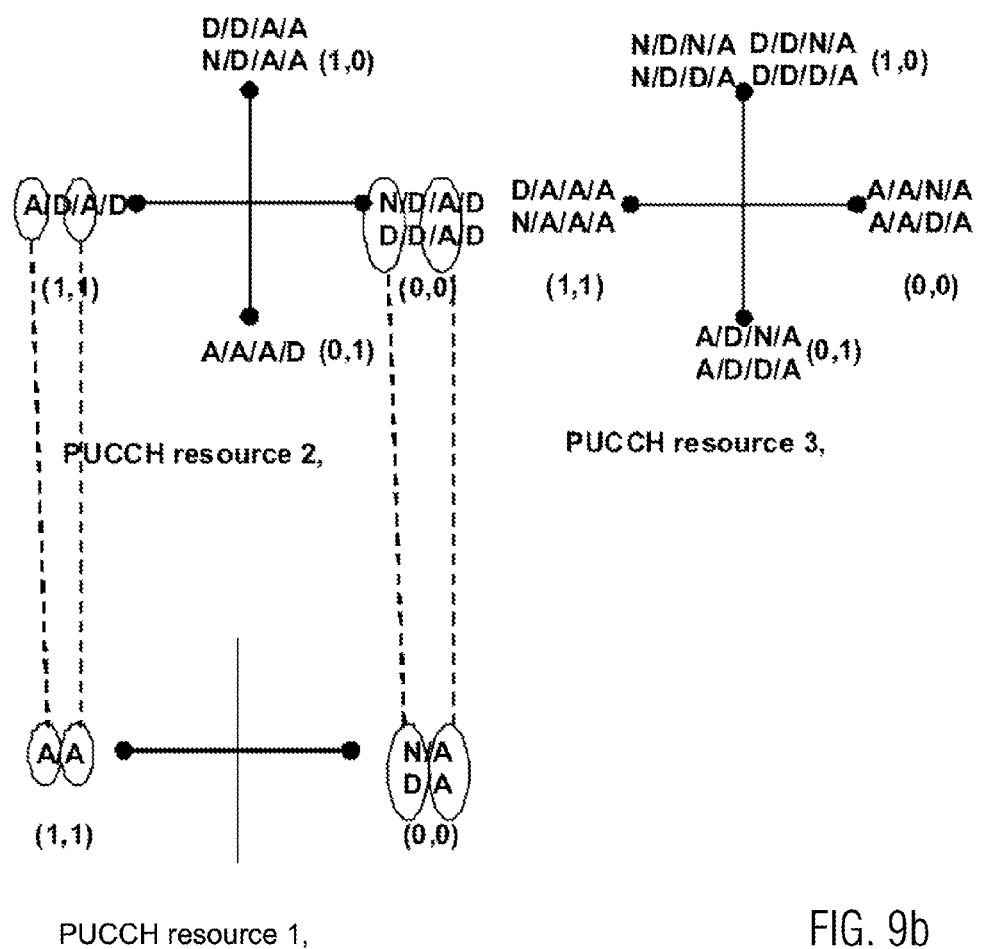

An example of the mapping according to an embodiment of the present invention is shown in Table 2, which is also illustrated in FIG. 8. FIG. 9 shows a comparison of the mapping of FIG. 8 and the conventional Rel-10 A=2 mapping. The circles indicate the HARQ-ACK values that are fallback compatible with Rel-10.

The upper and the lower part of FIG. 9 uses different numbering of PUCCH resources. In this respect, it should be pointed out that PUCCH resource 0 in the upper part of the figure corresponds to PUCCH resource 0 in the lower part of the figure; PUCCH resource 2 in the upper part of the figure corresponds to PUCCH resource 1 in the lower part of the figure. HARQ-ACK(0) in the upper part of the figure corresponds to HARQ-ACK(0) in the lower part of the figure; HARQ-ACK(2) in the upper part of the figure corresponds to HARQ-ACK(1) in the lower part of the figure. It is apparent from FIG. 9 that if PDCCH for E-PDCCH reconfiguration is not detected, the interpretation of the HARQ-ACK value of transport block in primary cell and the HARQ-ACK value of transport block in secondary cell is the same as Rel-10 without E-PDCCH reconfiguration.

TABLE 2

Mapping table of A = 2 according to the present invention

| HARQ-ACK(0) | HARQ-ACK(1) | HARQ-ACK(2) | HARQ-ACK(3) | PUCCH resource 0 | PUCCH resource 1 | PUCCH resource 2 | PUCCH resource 3 |
|---|---|---|---|---|---|---|---|
| ACK | ACK | ACK | ACK | 0, 1 | | | |
| ACK | DTX | ACK | ACK | 1, 0 | | | |
| NACK/DTX | ACK | ACK | ACK | | | | 1, 1 |
| NACK/DTX | DTX | ACK | ACK | | | 1, 0 | |
| ACK | ACK | ACK | DTX | | | 0, 1 | |
| ACK | DTX | ACK | DTX | | | 1, 1 | |
| NACK/DTX | ACK | ACK | DTX | | 0, 1 | | |
| NACK/DTX | DTX | ACK | DTX | | 0, 0 | | |
| ACK | ACK | NACK/DTX | ACK | | | | 0, 0 |
| ACK | DTX | NACK/DTX | ACK | | | | 0, 1 |
| NACK/DTX | ACK | NACK/DTX | ACK | | 1, 0 | | |
| NACK/DTX | DTX | NACK/DTX | ACK | | | | 1, 0 |
| ACK | ACK | NACK/DTX | DTX | | | 1, 1 | |
| ACK | DTX | NACK/DTX | DTX | 1, 1 | | | |
| NACK/DTX | ACK | NACK/DTX | DTX | | 0, 0 | | |

TABLE 2-continued

Mapping table of A = 2 according to the present invention

| HARQ-ACK(0) | HARQ-ACK(1) | HARQ-ACK(2) | HARQ-ACK(3) | PUCCH resource 0 | PUCCH resource 1 | PUCCH resource 2 | PUCCH resource 3 |
|---|---|---|---|---|---|---|---|
| NACK | DTX | NACK/DTX | DTX | 0, 0 | | | |
| DTX | NACK/DTX | DTX | DTX | | No Transmission | | |

Figure 10A:
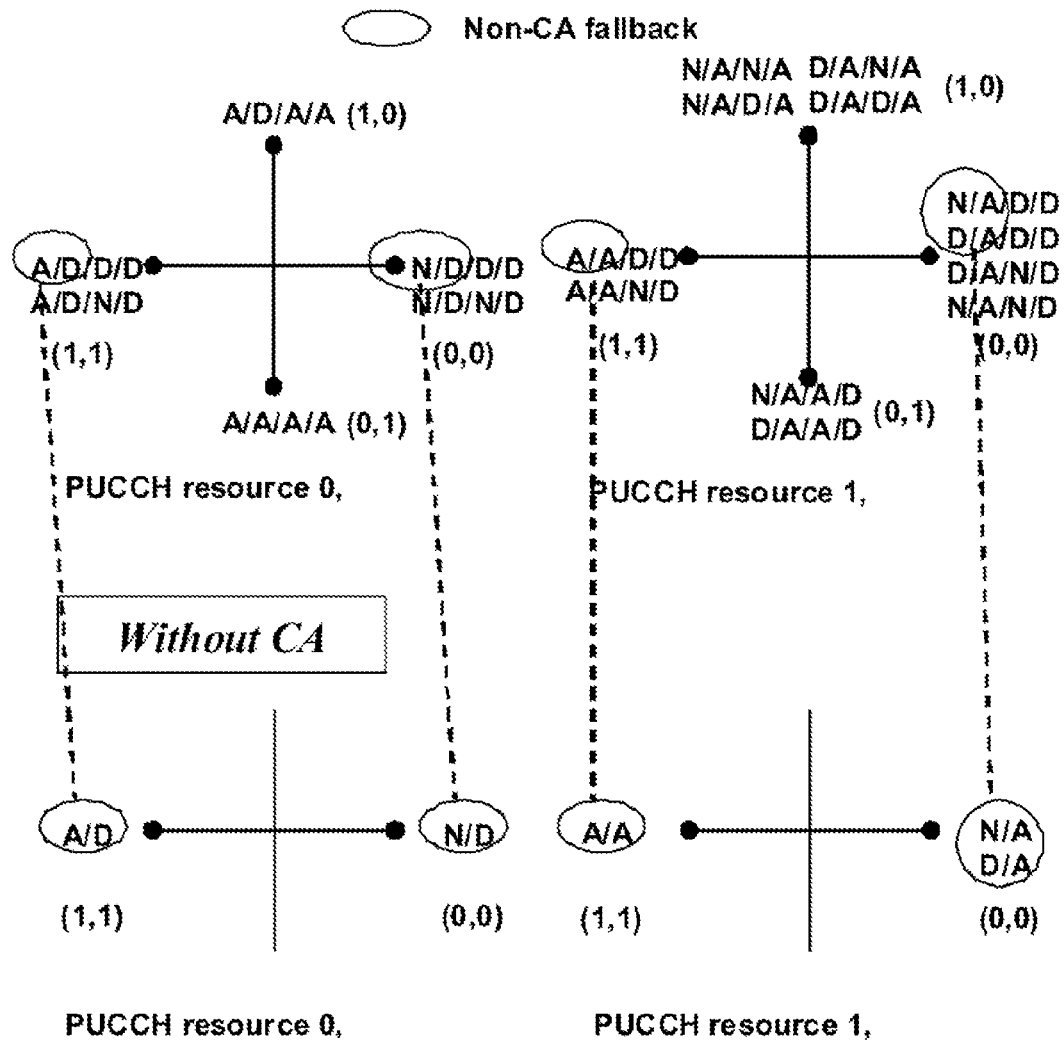
FIG. 10 shows a comparison of the A=2 mapping of FIG. 8 and the non-CA case with E-PDCCH reconfiguration.
Figure 10B:
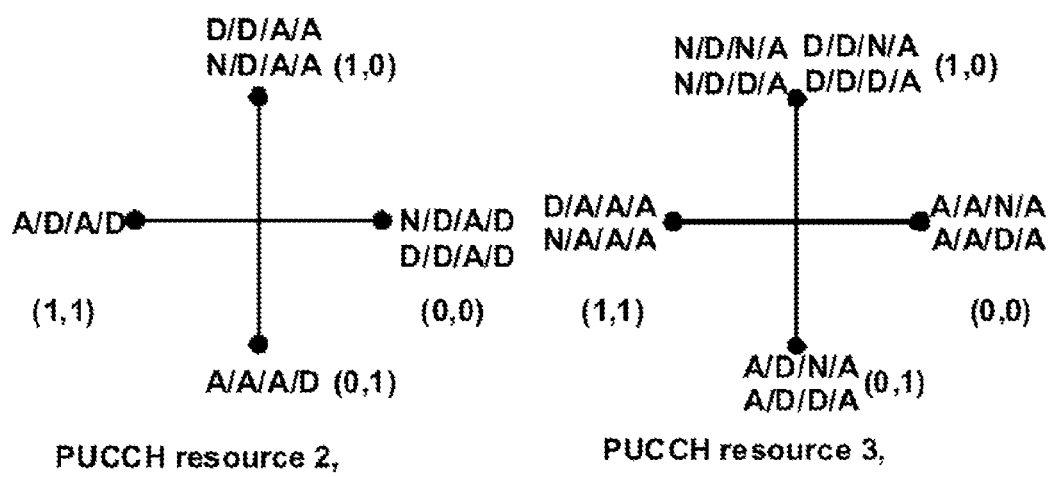

FIG. 10 shows a comparison of the mapping of FIG. 8 and the mapping in a non-CA (Carrier Aggregation) case. The circles indicate the HARQ-ACK values that are fallback compatible with non-CA. PUCCH resource 0 in the upper part of the figure corresponds to PUCCH resource 0 in the lower part of the figure; PUCCH resource 1 in the upper part of the figure corresponds to PUCCH resource 1 in the lower part of the figure. HARQ-ACK(0) in the upper part of the figure corresponds to HARQ-ACK(0) in the lower part of the figure; HARQ-ACK(1) in the upper part of the figure corresponds to HARQ-ACK(1) in the lower part of the figure.

It is apparent from FIG. 10 that, if PDCCH for PDSCH on the secondary cell and PDCCH for E-PDCCH reconfiguration on the secondary cell are not detected, the interpretation of the HARQ-ACK value of transport in primary cell and the HARQ-ACK value of PDCCH based E-PDCCH reconfiguration is the same as in the case without carrier aggregation.

It can also be see from FIG. 8 that on PUCCH resource j, the value of HARQ-ACK(j) is not "D". This means that, when PUCCH format 1b is transmitted on PUCCH resource j, the corresponding PDCCH was detected.

In case of A=3, up to two transport blocks are supported on one serving cell and only one transport block is supported on the other serving cell. From Table 1, it can be seen that HARQ-ACK(0) corresponds to the HARQ-ACK for TB1 of serving cell 1, HARQ-ACK(1) corresponds to the HARQ-ACK for TB2 of serving cell 1 or HARQ-ACK for PDCCH reconfiguration of serving cell 1, HARQ-ACK(2) corresponds to the HARQ-ACK for TB1 of serving cell 2 and HARQ-ACK(3) corresponds to the HARQ-ACK for PDCCH based E-PDCCH reconfiguration of serving cell 2. For serving cell 1, a transmission of two transport blocks and PDCCH for E-PDCCH reconfiguration on the same subframe is not supported.

The PUCCH resources used for channel selection are ordered in the ascending order of j. If HARQ-ACK(1) corresponds to the HARQ-ACK for TB2 of serving cell 1, PUCCH resource 1 is the corresponding PUCCH of TB2 of serving cell 1; otherwise, PUCCH resource 1 is the corresponding PUCCH of PDCCH for E-PDCCH reconfiguration of serving cell 1.

The interpretation of HARQ-ACK(1) and PUCCH resource 1 is shown in Table 3. If none or only one transport block is detected for serving cell 1 by a UE, both HARQ-ACK(1) and PUCCH resource 1 correspond to the one of PDCCH for E-PDCCH reconfiguration. If two transport blocks are detected for serving cell 1 by a UE, both HARQ-ACK(1) and PUCCH resource 1 correspond to the one of PDCCH for E-PDCCH reconfiguration. If two transport blocks are misdetected, HARQ-ACK(0) and HARQ-ACK(1) would be "D/D" and PUCCH 1 would not be used, so there will be no misinterpretation between UE and eNB.

TABLE 3

Interpretation of HARQ-ACK(1) and PUCCH resource 1 depending on received TBs and E-PDCCH reconfiguration

| TB1 serving cell 1 | TB2 serving cell 1 | E-PDCCH reconfig | HARQ-ACK(1) | PUCCH resource 1 |
|---|---|---|---|---|
| — | — | — | TB2/E-PDCCH | TB2/E-PDCCH |
| Yes | — | — | E-PDCCH | E-PDCCH |
| — | — | Yes | E-PDCCH | E-PDCCH |
| Yes | Yes | — | TB2 | TB2 |
| Yes | — | Yes | E-PDCCH | E-PDCCH |

In case of A=3, the mapping of HARQ-ACK(j) value and b(0)b(1) in PUCCH format 1b and the PUCCH resource used for transmission is performed according to the following rules:

It is fallback compatible with A=3 in Rel-10, i.e. if no PDCCH for E-PDCCH reconfiguration is detected, the interpretation of HARQ-ACK values is the same as if no E-PDCCH was configured.

It is fallback compatible with the non-CA case with configured E-PDCCH, i.e. if no PDSCH and no PDCCH for E-PDCCH reconfiguration are detected in the secondary cell, the interpretation of HARQ-ACK values is the same as in the non-CA case.

A certain PUCCH resource is used only when the corresponding PDCCH/PDSCH is detected.

Figure 11:
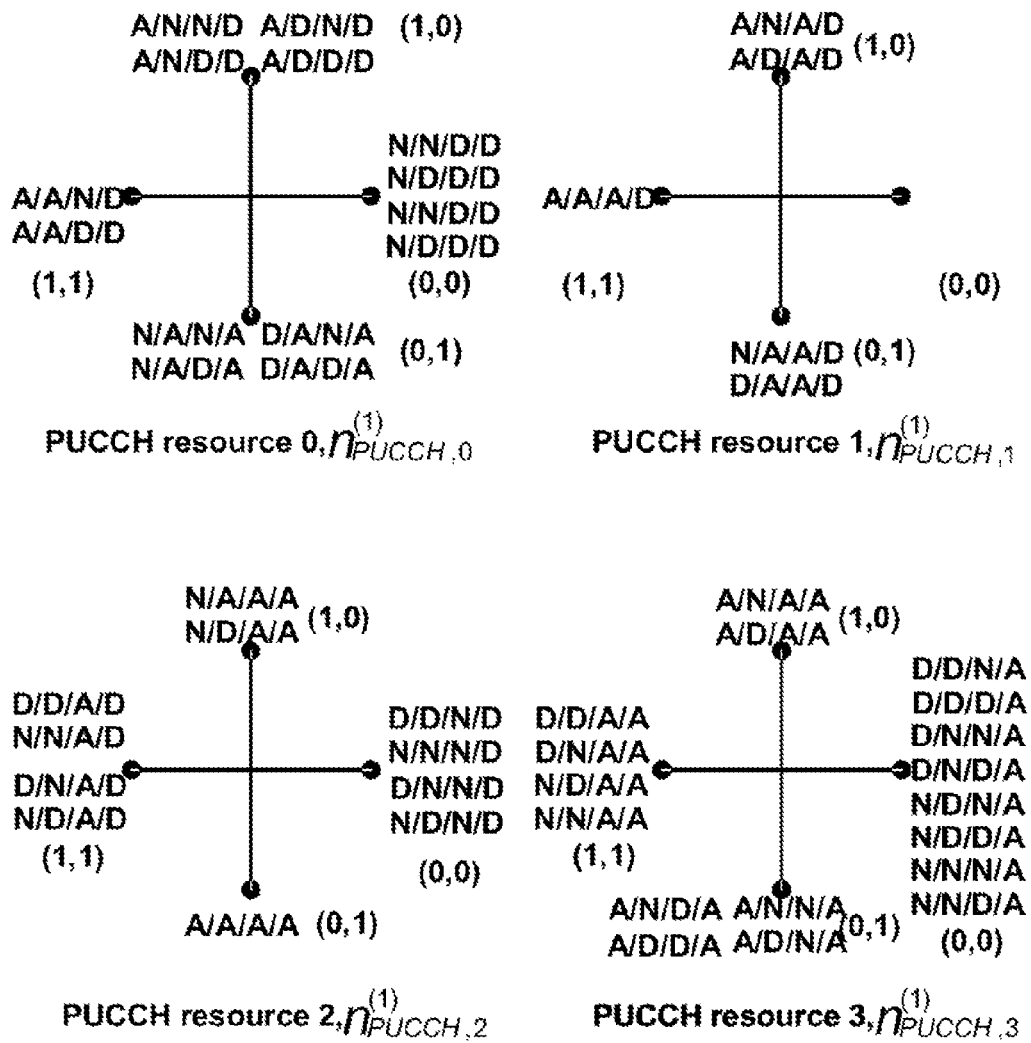
FIG. 11 shows an example of an A=3 mapping according to an embodiment of the present invention.
Figure 12B:
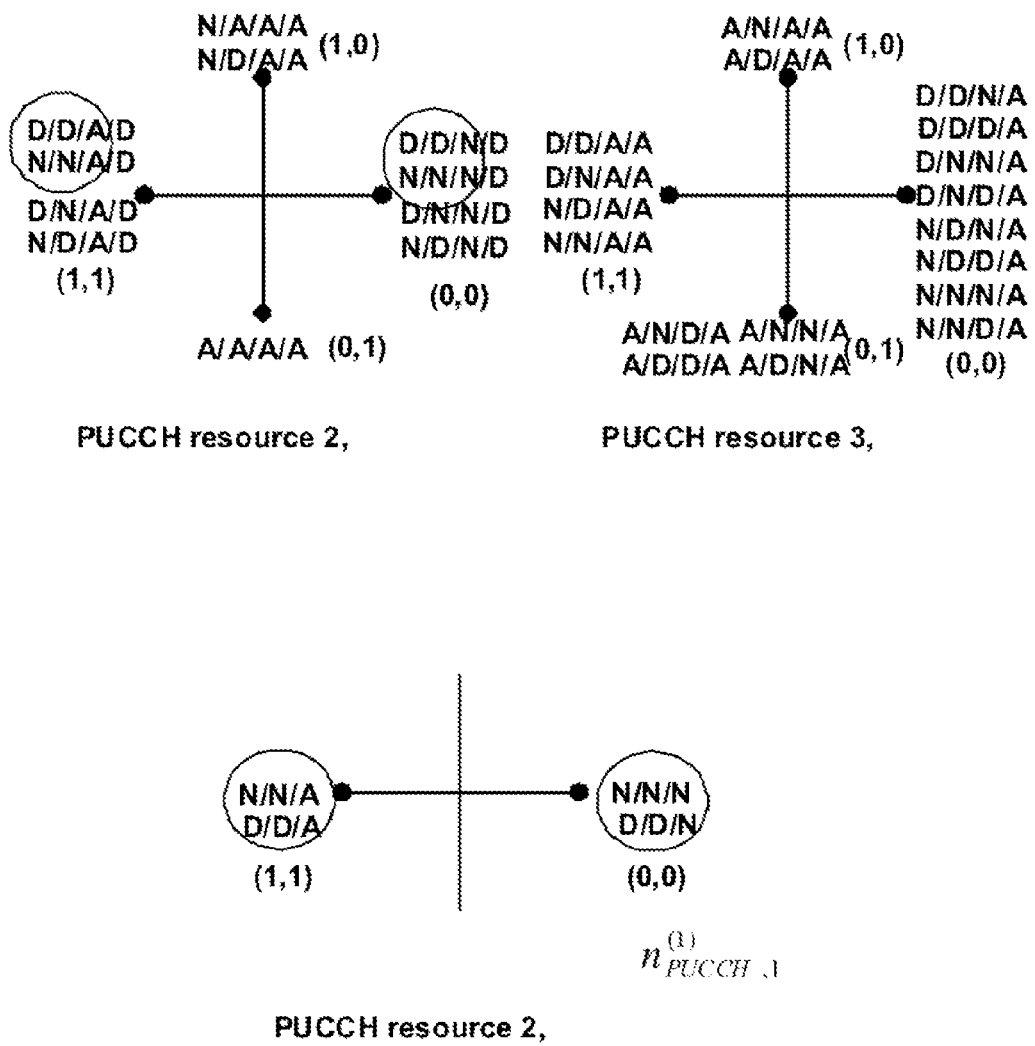
FIG. 12 shows a comparison of the A=3 mapping of FIG. 11 and the A=3 mapping of Rel-10.

An example of such a mapping according to an embodiment of the present invention is shown in Table 4, which is also illustrated in FIG. 11. A comparison of the mapping in FIG. 11 and the mapping of A=3 in Rel-10 is shown in FIG. 12. It can be seen from this figure that the mapping is fallback with A=3 in Rel-10, i.e. if the interpretation of HARQ-ACK values is the same in case of a misdetection of PDCCH for E-PDCCH reconfiguration and in case no E-PDCCH is configured.

TABLE 4

Mapping table of A = 3 according to the present invention

| HARQ-ACK(0) | HARQ-ACK(1) | HARQ-ACK(2) | HARQ-ACK(3) | PUCCH resource 0 | PUCCH resource 1 | PUCCH resource 2 | PUCCH resource 3 |
|---|---|---|---|---|---|---|---|
| ACK | ACK | ACK | ACK | | | 0, 1 | |
| ACK | NACK/DTX | ACK | ACK | | | | 1, 0 |
| NACK/DTX | ACK | ACK | ACK | | | 1, 0 | |

TABLE 4-continued

Mapping table of A = 3 according to the present invention

| HARQ-ACK(0) | HARQ-ACK(1) | HARQ-ACK(2) | HARQ-ACK(3) | PUCCH resource 0 | PUCCH resource 1 | PUCCH resource 2 | PUCCH resource 3 |
|---|---|---|---|---|---|---|---|
| NACK/DTX | NACK/DTX | ACK | ACK | | | | 1, 1 |
| ACK | ACK | ACK | DTX | | 1, 1 | | |
| ACK | NACK/DTX | ACK | DTX | | 1, 0 | | |
| NACK/DTX | ACK | ACK | DTX | | 0, 1 | | |
| NACK/DTX | NACK/DTX | ACK | DTX | | | 1, 1 | |
| ACK | ACK | NACK/DTX | ACK | 1, 1 | | | |
| ACK | NACK/DTX | NACK/DTX | ACK | | | | 0, 1 |
| NACK/DTX | ACK | NACK/DTX | ACK | 0, 1 | | | |
| NACK/DTX | NACK/DTX | NACK/DTX | ACK | | | | 0, 0 |
| ACK | ACK | NACK/DTX | DTX | | | | |
| ACK | NACK/DTX | NACK/DTX | DTX | 1, 0 | | | |
| NACK/DTX | ACK | NACK/DTX | DTX | | 0, 0 | | |
| NACK | NACK/DTX | DTX | DTX | 0, 0 | | | |
| NACK/DTX | NACK/DTX | NACK | DTX | | | 0, 0 | |
| DTX | NACK/DTX | DTX | DTX | | No Transmission | | |

Figure 13A:
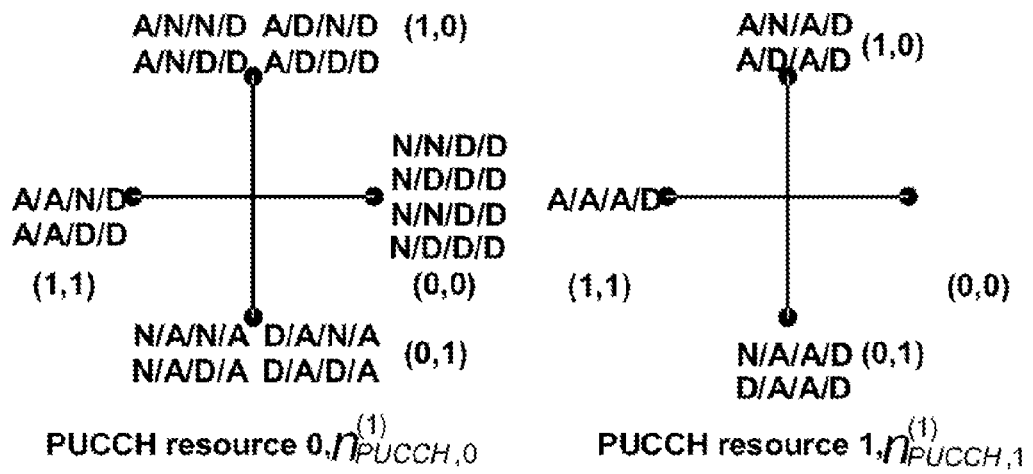
FIG. 13 shows a comparison of the A=3 mapping of FIG. 11 and the non-CA case with E-PDCCH reconfiguration.
Figure 13B:
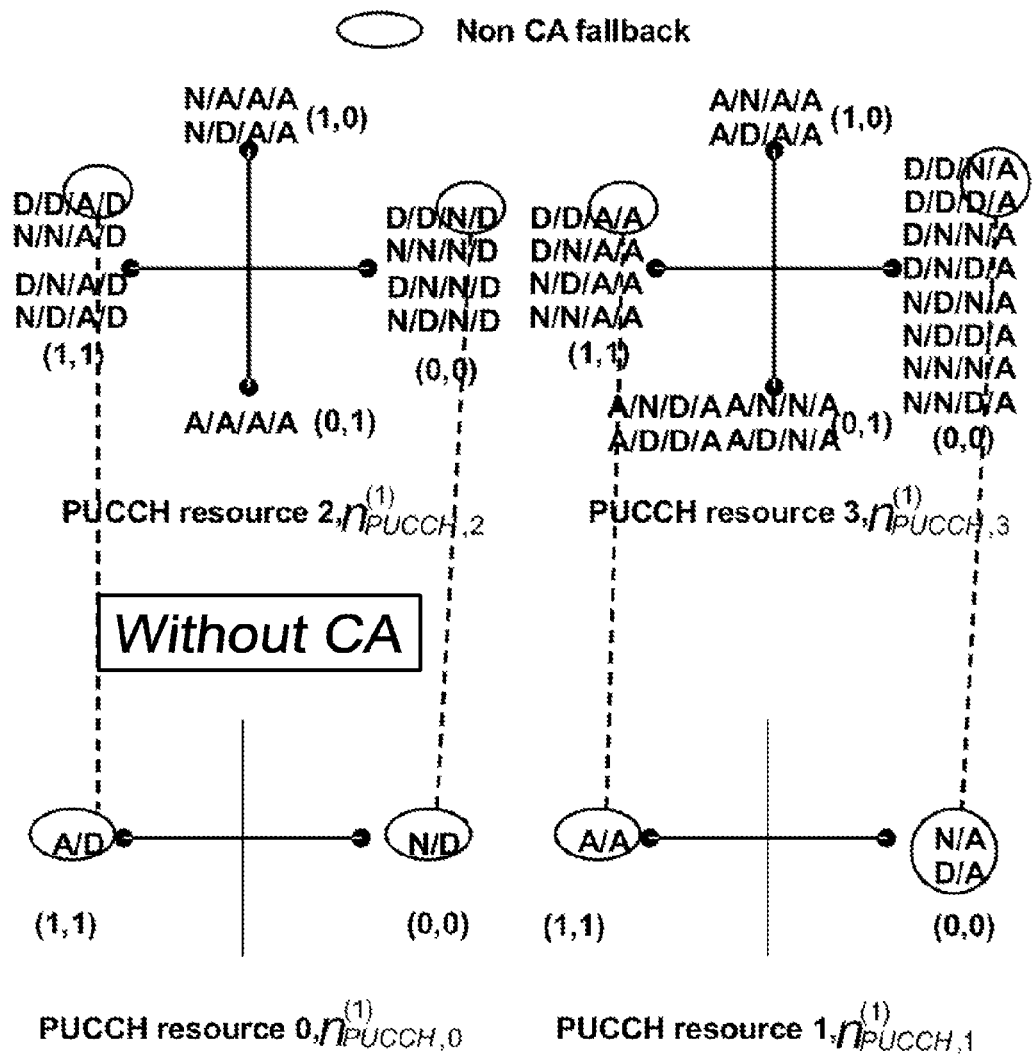

FIG. 13 shows a comparison of the mapping in FIG. 11 and the mapping of A=2 in Rel-10. In this case, serving cell 2 is the primary cell. If no PDSCH and PDCCH for E-PDCCH reconfiguration are detected in the secondary cell, the interpretation of HARQ-ACK values in FIG. 13 would be same as in the non carrier aggregation case in Rel-10.

It can also be see from FIG. 11 that on PUCCH resource j, the value of HARQ-ACK(j) is not "D". This means that when PUCCH format 1b is transmitted on PUCCH resource j, the corresponding PDCCH was detected.

In case of A=4, up to two transport blocks are supported on both the primary cell and the secondary cell. From Table 3, it can be seen that HARQ-ACK(0) corresponds to the HARQ-ACK for TB1 received via the primary cell, HARQ-ACK(1) corresponds to the HARQ-ACK for TB2 received via the primary cell or HARQ-ACK for PDCCH reconfiguration received via the primary cell, HARQ-ACK(2) corresponds to the HARQ-ACK for TB1 received via the secondary cell, and HARQ-ACK(3) corresponds to the HARQ-ACK for TB2 received via the secondary cell or HARQ-ACK for PDCCH reconfiguration received via the secondary cell. For both the primary cell and the secondary cell, a transmission of two transport blocks and PDCCH for E-PDCCH reconfiguration on the same subframe is not supported.

The PUCCH resources used for channel selection are ordered in the ascending order of j. If HARQ-ACK(1) corresponds to the HARQ-ACK for TB2 of the primary cell, PUCCH resource 1 is the corresponding PUCCH resource to TB2 of the primary cell; otherwise, PUCCH resource 1 is the corresponding PUCCH resource to PDCCH for E-PDCCH reconfiguration of the primary cell. If HARQ-ACK(3) corresponds to the HARQ-ACK for TB2 of the secondary cell, PUCCH resource 1 is the corresponding PUCCH resource to TB2 of the secondary; otherwise, PUCCH resource 1 is the corresponding PUCCH resource to PDCCH for E-PDCCH reconfiguration of the secondary cell.

In case of A=4, the mapping table of Rel-10 as in FIG. 14 can be reused. The same interpretation of HARQ-ACK(1) and PUCCH resource 1 as described with reference to Table 3 may also be applied to TB1 and TB2 of the primary cell. Similarly, the interpretation of HARQ-ACK(3) and PUCCH resource 3 is similar follows the same idea as described for TB1 and TB2 of the primary cell. If TB1 and TB2 of the primary cell are misdetected, PUCCH resource 1 is not used and "D/D" would be the value of HARQ-ACK(0)/HARQ-ACK(1). Therefore, there will be no misunderstanding between eNB and UE. The same applies to TB1 and TB2 of the secondary cell.

According to the present invention, PDCCH based E-PDCCH reconfiguration is supported, so that the delay and overhead of E-PDCCH reconfiguration is small. Moreover, at least one transport block transmission is supported on the same subframe as PDCCH for E-PDCCH reconfiguration for the same serving cell.

Further, the present invention is fallback compatible with Rel-10. Moreover, E-PDCCH reconfiguration in carrier aggregation case is fallback compatible with the non carrier aggregation case.

Second Embodiment

According to a second embodiment of the present invention, the mapping tables of A=2, 3, 4 of Rel-10 are reused. In order to support the transmission of HARQ-ACK for PDCCH based E-PDCCH reconfiguration and HARQ-ACK for PDSCH on the same subframe, the mapping of HARQ-ACK (j) and transport block and E-PDCCH reconfiguration is shown in Table 5.

TABLE 5

Mapping of Transport Block and E-PDCCH reconfiguration and Serving Cell to HARQ-ACK(j) of Variant 1

| | | HARQ-ACK(j) | | | |
|---|---|---|---|---|---|
| A | HARQ-ACK(0) | | HARQ-ACK(1) | HARQ-ACK(2) | HARQ-ACK(3) |
| 2 | TB1/E-PDCCH reconfig Primary cell | | TB2/E-PDCCH reconfig Secondary cell | NA | NA |

TABLE 5-continued

Mapping of Transport Block and E-PDCCH reconfiguration and Serving Cell to HARQ-ACK(j) of Variant 1

| | | HARQ-ACK(j) | | |
|---|---|---|---|---|
| A | HARQ-ACK(0) | HARQ-ACK(1) | HARQ-ACK(2) | HARQ-ACK(3) |
| 3 | TB1 Serving cell1 | TB2/E-PDCCH reconfig Serving cell1 | TB3/E-PDCCH reconfig Serving cell2 | NA |
| 4 | TB1 Serving cell1 | TB2/E-PDCCH reconfig Serving cell1 | TB1 Serving cell2 | TB2/E-PDCCH reconfig Serving cell2 |

In case of A=2, HARQ-ACK for PDCCH based E-PDCCH reconfiguration is treated in the same manner as HARQ-ACK for PDCCH based SPS deactivation. PDCCH based E-PDCCH reconfiguration and PDSCH for different serving cells may be transmitted on the same subframe, but not for the same serving cell.

In case of A=3, for serving cell 1, HARQ-ACK for PDCCH based E-PDCCH reconfiguration and PDSCH may be transmitted on the same subframe if at most one transport block is transmitted. The interpretation of HARQ-ACK(1) and PUCCH resource 1 is same as in Table 3, i.e. if two transport blocks are detected for serving cell 1, HARQ-ACK(1) and PUCCH resource 1 correspond to the ones of TB2 of serving cell 1; otherwise, HARQ-ACK(1) and PUCCH resource 1 correspond to the ones of PDCCH based reconfiguration.

In case of A=4, for both the primary cell and the secondary cell, HARQ-ACK for PDCCH based E-PDCCH reconfiguration and PDSCH can be transmitted on the same subframe if at most one transport block is transmitted. The interpretation of HARQ-ACK(1) and PUCCH resource 1 is same as in Table 3, i.e. if two transport blocks are detected for the primary cell, HARQ-ACK(1) and PUCCH resource 1 correspond to the ones of TB2 of the primary cell; otherwise, HARQ-ACK(1) and PUCCH resource 1 correspond to the ones of PDCCH based reconfiguration. The same applies to HARQ-ACK(3) and PUCCH resource 3 and the secondary cell.

According to the second embodiment, the mapping table of A=2, 3, 4 of Rel-10 can be reused. However, in case of A=2, PDSCH and PDCCH based E-PDCCH reconfiguration for the same serving cell cannot be transmitted on the same subframe. In case of A=3 case, PDSCH of serving cell 2 and PDCCH based E-PDCCH reconfiguration for serving cell 2 cannot be transmitted on the same subframe.

Third Embodiment

According to a third embodiment of the present invention the mapping table of A=2 of the first embodiment is used for A=3 mapping. In case of A=3, if two transport blocks are detected for serving cell 1, A=3 mapping of Rel-10 is reused; otherwise, A=2 mapping of the main idea is used.

The benefit of the third embodiment is that the A=3 mapping table does not need to be designed. However, in case of A=3, PDSCH of serving cell 2 and PDCCH based E-PDCCH reconfiguration for serving cell 2 cannot be transmitted on the same subframe.

Summarizing, the present invention relates to rapid search space reconfiguration for E-PDCCH (Enhanced Physical Downlink Control CHannel) in wireless communication system and to avoid flashlight interferences from neighbouring cells and to allocate the E-PDCCH on the best physical resource blocks (PRBs) in frequency fluctuation dominated scenarios. To this end, a method for providing low-latency feedback on a reconfiguration attempt of a search space for an Enhanced-PDCCH, and a corresponding apparatus are provided. Specifically, a signalling scheme is provided that supports transmission of both HARQ-ACK for PDCCH based E-PDCCH reconfiguration and HARQ-ACK for PDSCH (Physical Downlink Shared CHannel) on the same uplink subframe, so that an acknowledgment of PDCCH based E-PDCCH reconfiguration information and PDSCH information can be transmitted on the same subframe.

The invention claimed is:

1. A method for providing, by a receiving apparatus (UE) configured with at least one serving cell including a primary cell, simultaneously feedback on reconfiguration attempts of search spaces for enhanced physical downlink control channels (E-PDCCH) and feedback on at least one downlink transmission to a transmitting apparatus (eNB), the method comprising the following steps performed by the receiving apparatus (UE):
   receiving the at least one downlink transmission via the at least one serving cell from the transmitting apparatus,
   receiving from the transmitting apparatus reconfiguration information for reconfiguration of the search spaces for the at least one serving cell,
   determining for the at least one downlink transmission whether the received downlink transmission is successfully decodable, and determining whether the received reconfiguration information is successfully decodable,
   generating a feedback tuple including ACK/NACK/DTXs determined based on the successful/un-successful decoding of the at least one downlink transmission and including ACK/DTXs determined based on the successful/un-successful decoding of the reconfiguration information,
   transmitting the feedback tuple as a combination of:
   a selected one of a plurality of uplink resources available for transmitting the feedback tuple via the primary cell, and
   a selected one of a plurality of modulation symbols of a modulation scheme for transmission on the selected uplink resource.

2. The method according to claim 1, wherein the feedback tuple is transmitted via the selected uplink resource and using the selected modulation symbol in PUCCH format 1b or PUCCH format 3, and/or wherein the selected one of the plurality of uplink resources is from a number of the plurality of uplink, PUCCH, resources which is larger than the number, $A \in \{1,2,3,4\}$, of uplink, PUCCH, resources on the primary cell that correspond to the received downlink, PDSCH, transmissions.

3. The method according to claim 1, wherein, in case the number of uplink, PUCCH, resources that correspond to the received downlink, PDSCH, transmissions is one, $A=\{1\}$, the reception of at least one downlink transmission via the primary cell includes reception of at least one transport block, to which a first uplink, PUCCH, resource corresponds, and/or wherein the selected uplink, PUCCH, resources is at least one of:
a first PUCCH resource, defined as PUCCH resource 0, corresponding to the reception of the at least one transport block via the primary cell,
a second PUCCH resource, defined as PUCCH resource 1, corresponding to the PDCCH for E-PDCCH reconfiguration information received via the primary cell, the second PUCCH resource being derived from the first control channel element, CCE, of the PDCCH for E-PDCCH reconfiguration information.

4. The method according to claim 3, wherein, in case the reception of one downlink transmission via the primary serving cell includes reception of a first transport block, a first position of the feedback tuple, defined as HARQ-ACK(0), indicates a successful/un-successful decoding of the first transport block received via the primary cell, a second position of the feedback tuple, defined as HARQ-ACK(1), indicates a successful/un-successful decoding of the reconfiguration information received via the primary cell, or wherein, in case the reception of one downlink transmission via the primary serving cell includes reception of a first and a second transport block, a first position of the feedback tuple, defined as HARQ-ACK(0), indicates a successful/un-successful decoding of the first transport block received via the primary cell, a second position of the feedback tuple, defined as HARQ-ACK(1), indicates a successful/un-successful decoding of the second transport block received via the primary cell, and a third position of the feedback tuple, defined as HARQ-ACK(2), indicates a successful/un-successful decoding of the reconfiguration information received via the primary cell.

5. The method according to claim 3, wherein for the generated feedback tuple of ACK/NACK/DTXs, defined by HARQ-ACK(0), HARQ-ACK(1), or HARQ-ACK(0), HARQ-ACK(1), HARQ-ACK(2), a selection of the selected one of a plurality of uplink, PUCCH, resources and a selection of the selected one of a plurality of modulation symbols, defined by (0,0) or (0,1) or (1,0) or (1,1), is based on a feedback mapping rule such that the transmission of the generated feedback tuple of ACK/NACK/DTXs is performed on the first PUCCH resource, in case the decoding of the received reconfiguration information is successful, and that the transmission of the generated feedback tuple of ACK/NACK/DTXs is performed on the second PUCCH resource, in case the decoding of the reconfiguration information is un-successful.

6. The method according to claim 1, wherein, in case the number of uplink, PUCCH, resources that correspond to the received downlink, PDSCH, transmissions is two, A ={2}, the reception of at least one downlink transmission via a first serving cell includes reception of a first transport block, and the reception of at least one downlink transmission via a second serving cell includes reception of a second transport block, and/or wherein the selected uplink, PUCCH, resources is at least one of:
a first PUCCH resource, defined as PUCCH resource 0, corresponding to the reception of the first transport block via the first serving cell,
a second PUCCH resource, defined as PUCCH resource 1, corresponding to the PDCCH for E-PDCCH reconfiguration information received via the first serving cell, the second PUCCH resource being derived from the first control channel element, CCE, of the PDCCH for E-PDCCH reconfiguration information,
a third PUCCH resource, defined as PUCCH resource 2, corresponding to the reception of the second transport block via the second serving cell,
a fourth PUCCH resource, defined as PUCCH resource 3, corresponding to the PDCCH for E-PDCCH reconfiguration information received via the second serving cell, the fourth PUCCH resource being chosen by a transmit power control, TPC, field of the PDCCH for E-PDCCH from higher layer configured PUCCH resources.

7. The method according to claim 6, wherein a first position of the generated feedback tuple, defined as HARQ-ACK(0), indicates a successful/un-successful decoding of the first transport block received via the first serving cell, a second position of the feedback tuple, defined as HARQ-ACK(1), indicates a successful/un-successful decoding of the reconfiguration information received via the first serving cell, a third position of the feedback tuple, defined as HARQ-ACK(2), indicates a successful/un-successful decoding of the second transport block received via the second serving cell and a fourth position of the feedback tuple, defined as HARQ-ACK(3), indicates a successful/un-successful decoding of the reconfiguration information received via the second serving cell.

8. The method according to claim 6, wherein for the generated feedback tuple of ACK/NACK/DTXs, defined by HARQ-ACK(0), HARQ-ACK(1), HARQ-ACK(2), HARQ-ACK(3), a selection of the selected one of a plurality of uplink, PUCCH, resources and a selection of the selected one of a plurality of modulation symbols, defined by (0,0) or (0,1) or (1,0) or (1,1), is based on a feedback mapping rule such that:

in case the decoding of the received reconfiguration information is un-successful, the generated feedback tuple of ACK/NACK/DTXs is transmitted either via the first PUCCH resource or via the third PUCCH resource, and in this case,
i. if the first transport block via the first serving cell is decoded successfully and the PDCCH corresponding to the second transport block via the second serving cell is decoded un-successfully or the second transport block via the second serving cell is decoded un-successfully, the modulation symbol (1,1) is selected as modulation scheme for transmission via the first PUCCH resource;
ii. if the first transport block via the first serving cell is decoded un-successfully and the PDCCH corresponding to the second transport block via the second serving cell is decoded un-successfully or the second transport block via the second serving cell is decoded un-successfully, the modulation symbol (0,0) is selected as modulation scheme for transmission via the first PUCCH resource ;
iii. if the first transport block via the first serving cell is decoded successfully and the second transport block via the second serving cell is also decoded successfully, the modulation symbol (1,1) is selected as modulation scheme for transmission via the third PUCCH resource;
iv. if the PDCCH corresponding to the first transport block via the first serving cell is decoded un-successfully or the first transport block via the first serving cell is decoded un-successfully and the second transport block via the second serving cell is decoded successfully, the modulation symbol (0,0) is selected as modulation scheme for transmission via the third PUCCH resource, excluded from selection for transmission of the generated feedback tuple of ACK/NACK/DTXs, and/or wherein the feedback mapping rule corresponds to:

| HARQ-ACK(0) | HARQ-ACK(1) | HARQ-ACK(2) | HARQ-ACK(3) | PUCCH resource 0 | PUCCH resource 1 | PUCCH resource 2 | PUCCH resource 3 |
|---|---|---|---|---|---|---|---|
| ACK | ACK | ACK | ACK | 0, 1 | | | |
| ACK | DTX | ACK | ACK | 1, 0 | | | |
| NACK/DTX | ACK | ACK | ACK | | | | 1, 1 |
| NACK/DTX | DTX | ACK | ACK | | | 1, 0 | |
| ACK | ACK | ACK | DTX | | | 0, 1 | |
| ACK | DTX | ACK | DTX | | | 1, 1 | |
| NACK/DTX | ACK | ACK | DTX | | 0, 1 | | |
| NACK/DTX | DTX | ACK | DTX | | 0, 0 | | |
| ACK | ACK | NACK/DTX | ACK | | | | 0, 0 |
| ACK | DTX | NACK/DTX | ACK | | | | 0, 1 |
| NACK/DTX | ACK | NACK/DTX | ACK | | 1, 0 | | |
| NACK/DTX | DTX | NACK/DTX | ACK | | | | 1, 0 |
| ACK | ACK | NACK/DTX | DTX | | 1, 1 | | |
| ACK | DTX | NACK/DTX | DTX | 1, 1 | | | |
| NACK/DTX | ACK | NACK/DTX | DTX | | 0, 0 | | |
| NACK | DTX | NACK/DTX | DTX | 0, 0 | | | |
| DTX | NACK/DTX | DTX | DTX | | No Transmission | | | and/or wherein, in case the decoding of the second transport block received via the second serving cell is un-successful and the reconfiguration information received via the second serving cell is un-successful, the generated feedback tuple of ACK/NACK/DTXs is transmitted either via the first PUCCH resource or the second PUCCH resource, and in this case,
  i. if the first transport block via the first serving cell is decoded successfully and the reconfiguration information via the second serving cell is decoded un-successfully, the modulation symbol (1,1) is selected as modulation scheme for transmission via the first PUCCH resource;
  ii. if the first transport block via the first serving cell is decoded un-successfully and the reconfiguration information via the second serving cell is decoded un-successfully, the modulation symbol (0,0) is selected as modulation scheme for transmission via the first PUCCH resource;
  iii. if the first transport block via the first serving cell is decoded successfully and the reconfiguration information via the second serving cell is also decoded successfully, the modulation symbol (1,1) is selected as modulation scheme for transmission via the second PUCCH resource;
  iv. if the PDCCH corresponding to the first transport block via the first serving cell is decoded un-successfully or the first transport block via the first serving cell is decoded un-successfully and the second transport block via the second serving cell is decoded successfully, the modulation symbol (0,0) is selected as modulation scheme for transmission via the second PUCCH resource, and/or wherein, in case the PDCCH corresponding to the first transport block or the PDCCH corresponding to the second transport block is decoded un-successfully, the respective first or third PUCCH resource is excluded from selection for transmission of the generated feedback tuple of ACK/NACK/DTXs and/or in case the decoding of reconfiguration information received via the first or second serving cell is un-successful, the second PUCCH resource or the fourth PUCCH resource is excluded from selection for transmission of the generated feedback tuple of ACK/NACK/DTXs.

9. The method according to claim 1, wherein, in case the number of uplink, PUCCH, resources that correspond to the received downlink, PDSCH, transmissions is three, $A = \{3\}$, the reception of at least one downlink transmission via a first serving cell includes reception of a first and a second transport block, and the reception of at least one downlink transmission via a second serving cell includes reception of a third transport block, and/or wherein the selected uplink resources is at least one of:
  a first PUCCH resource, defined as PUCCH resource 0, corresponding to the reception of the first transport block via the first serving cell,
  a second PUCCH resource, defined as PUCCH resource 1, corresponding to the reception of the second transport block via the first serving cell,
  a third PUCCH resource, defined as PUCCH resource 2, corresponding to the reception of the third transport block via the second serving cell,
  a fourth PUCCH resource, also defined as PUCCH resource 1, corresponding to the PDCCH for E-PDCCH reconfiguration information received via the first serving cell, the fourth PUCCH resource being derived from the first control channel element, CCE, of the PDCCH for E-PDCCH reconfiguration information,
  a fifth PUCCH resource, also defined as PUCCH resource 3, corresponding to the PDCCH for E-PDCCH reconfiguration information received via the second serving cell, the fifth PUCCH resource being chosen by a transmit power control, TPC, field of the PDCCH for E-PDCCH from higher layer configured PUCCH resources.

10. The method according to claim 9, wherein,
  in case the decoding of the received PDCCH indicating the first and second transport block for the first serving cell is successful and the decoding of the via the first serving cell received reconfiguration information is un-successful, then a selection of the selected one of a plurality of available uplink resources is performed among the first PUCCH resource, the second PUCCH resource, and at least one of the third and fifth PUCCH resource, and a second position of the feedback tuple, defined as HARQ-ACK(1), indicates the successful/un-successful decoding of the second transport block, or otherwise a selection of the selected one of a plurality of available uplink resources is performed among the first PUCCH resource, at least one of the third and fifth PUCCH resource, and the fourth PUCCH resource, and a second position of the feedback tuple, defined as HARQ-ACK(1), indicates the successful/un-successful decoding of the reconfiguration information received via the first serving cell, and/or wherein a first position of the feedback tuple, defined as HARQ-ACK(0), indicates a successful/un-successful decoding of the first transport block received via the first serving cell, and a third position of the feedback tuple, defined as HARQ-ACK(2), indicates a successful/un-successful decoding of the third transport block received via the second serving cell, and a fourth position of the feedback tuple, defined as HARQ-ACK(3), indicates a successful/un-successful decoding of the reconfiguration information received via the second serving cell.

11. The method according to claim 9, wherein for the generated feedback tuple of ACK/NACK/DTXs, defined by HARQ-ACK(0), HARQ-ACK(1), HARQ-ACK(2), HARQ-ACK(3), a selection of the selected one of a plurality of uplink, PUCCH, resources and a selection of the selected one of a plurality of modulation symbols, defined by (0,0) or (0,1) or (1,0) or (1,1), is based on a feedback mapping rule corresponding to:

| HARQ-ACK(0) | HARQ-ACK(1) | HARQ-ACK(2) | HARQ-ACK(3) | PUCCH resource 0 | PUCCH resource 1 | PUCCH resource 2 | PUCCH resource 3 |
|---|---|---|---|---|---|---|---|
| ACK | ACK | ACK | ACK | | | 0, 1 | |
| ACK | NACK/DTX | ACK | ACK | | | | 1, 0 |
| NACK/DTX | ACK | ACK | ACK | | | 1, 0 | |
| NACK/DTX | NACK/DTX | ACK | ACK | | | | 1, 1 |
| ACK | ACK | ACK | DTX | | 1, 1 | | |
| ACK | NACK/DTX | ACK | DTX | | 1, 0 | | |
| NACK/DTX | ACK | ACK | DTX | | 0, 1 | | |
| NACK/DTX | NACK/DTX | ACK | DTX | | | 1, 1 | |
| ACK | ACK | NACK/DTX | ACK | 1, 1 | | | |
| ACK | NACK/DTX | NACK/DTX | ACK | | | | 0, 1 |
| NACK/DTX | ACK | NACK/DTX | ACK | 0, 1 | | | |
| NACK/DTX | NACK/DTX | NACK/DTX | ACK | | | | 0, 0 |
| ACK | ACK | NACK/DTX | DTX | | | | |
| ACK | NACK/DTX | NACK/DTX | DTX | 1, 0 | | | |
| NACK/DTX | ACK | NACK/DTX | DTX | | 0, 0 | | |
| NACK | NACK/DTX | DTX | DTX | 0, 0 | | | |
| NACK/DTX | NACK/DTX | NACK | DTX | | | 0, 0 | |
| DTX | NACK/DTX | DTX | DTX | No Transmission | | | |

12. The method according to claim 1, wherein, in case the number of uplink, PUCCH, resources that correspond to the received downlink, PDSCH, transmissions is four, A ={4}, the reception of at least one downlink transmission via a first serving cell includes reception of a first and a second transport block to which a first and a second uplink, PUCCH, resource correspond, and the reception of at least one downlink transmission via a second serving cell includes reception of a third and fourth transport block to which a third and fourth uplink, PUCCH, resources correspond, and/or wherein the selected uplink resources is at least one of:

a first PUCCH resource, defined as PUCCH resource 0, corresponding to the reception of the first transport block via the first serving cell, a second PUCCH resource, defined as PUCCH resource 1, corresponding to the reception of the second transport block via the first serving cell, a third PUCCH resource, defined as PUCCH resource 2, corresponding to the reception of the third transport block via the second serving cell, a fourth PUCCH resource, defined as PUCCH resource 3, corresponding to the reception of the fourth transport block via the second serving cell, a fifth PUCCH resource, also defined as PUCCH resource 1, corresponding to the PDCCH for E-PDCCH reconfiguration information received via the first serving cell, the fourth PUCCH resource being derived from the first control channel element, CCE, of the PDCCH for E-PDCCH reconfiguration information, a sixth PUCCH resource, also defined as PUCCH resource 3, corresponding to the PDCCH for E-PDCCH reconfiguration information received via the second serving cell, the fifth PUCCH resource being chosen by a transmit power control, TPC, field of the PDCCH for E-PDCCH from higher layer configured PUCCH resources.

13. The method according to claim 12, wherein, in case the decoding of the received PDCCH indicating first and second transport block for the first serving cell is successful and the decoding of the via the first serving cell received reconfiguration information is un-successful, a selection of the selected one of a plurality of available uplink resources is performed among the first PUCCH resource, the second PUCCH resource, the third PUCCH resource and either the fourth or the sixth PUCCH resource, and a second position of the feedback tuple, defined as HARQ-ACK(1), indicates the successful/un-successful decoding of the second transport block, or otherwise a selection of the selected one of a plurality of available uplink resources is performed among the first uplink PUCCH resource, the third PUCCH resource, the fifth PUCCH resource and either the fourth or the sixth PUCCH resource and a second position of the feedback tuple, defined as HARQ-ACK(1), indicates the successful/un-successful decoding of the reconfiguration information received via the first serving cell, and in case the decoding of the received PDCCH indicating third and fourth transport block for the second serving cell is successful and the decoding of the via the second serving cell received reconfiguration information is un-successful, a selection of the selected one of a plurality of available uplink resources is performed among the first PUCCH resource, either the second or the fifth PUCCH resource, the third PUCCH resource and the fourth PUCCH resource, and a fourth position of the feedback tuple, defined as HARQ-ACK(3), indicates the successful/un-successful decoding of the fourth transport block, or otherwise a selection of the selected one of a plurality of available uplink resources is performed among the first uplink PUCCH resource, either the second or the fifth PUCCH resource, the third PUCCH resource and the sixth PUCCH resource and a fourth position of the feedback tuple, defined as HARQ-ACK(3), indicates the successful/un-successful decoding of the reconfiguration information received via the second serving cell, and/or wherein a first position of the feedback tuple, defined as HARQ-ACK(0), indicates a successful/un-successful decoding of the first transport block received via the first serving cell, and a third position of the feedback tuple, defined as HARQ-ACK(2), indicates a successful/un-successful decoding of the third transport block received via the second serving cell.

14. The method according to claim 12, wherein for the generated feedback tuple of ACK/NACK/DTXs, defined by HARQ-ACK(0), HARQ-ACK(1), HARQ-ACK(2), HARQ-ACK(3), a selection of the selected one of a plurality of uplink, PUCCH, resources and a selection of the selected one of a plurality of modulation symbols, defined by (0,0) or (0,1) or (1,0) or (1,1), is based on a feedback mapping rule corresponding to:

the processor is configured to generate a feedback tuple including ACK/NACK/DTXs determined based on the successful/un-successful decoding of the at least one downlink transmission and including ACK/DTXs determined based on the successful/un-successful decoding of the reconfiguration information, and a transmitter configured to transmit the feedback tuple as a combination of:

a selected one of a plurality of uplink resources available for transmitting the feedback tuple via the primary cell, and a selected one of a plurality of modulation symbols of a modulation scheme for transmission on the selected uplink resource.

16. The receiving apparatus according to claim 15, wherein the feedback tuple is transmitted via the selected uplink resource and using the selected modulation symbol in PUCCH format 1b or PUCCH format 3, and/or wherein the selected one of the plurality of uplink resources is from a number of the plurality of uplink, PUCCH, resources which is larger than the number, A ∈{1,2,3,4}, of uplink, PUCCH, resources on the primary cell that correspond to the received downlink, PDSCH, transmissions.

17. The receiving apparatus according to claim 15, wherein, in case the number of uplink, PUCCH, resources that correspond to the received downlink, PDSCH, transmissions is one, A={1}, the reception of at least one downlink

| HARQ-ACK(0) | HARQ-ACK(1) | HARQ-ACK(2) | HARQ-ACK(3) | PUCCH resource 0 | PUCCH resource 1 | PUCCH resource 2 | PUCCH resource 3 |
|---|---|---|---|---|---|---|---|
| ACK | ACK | ACK | ACK | | | 0, 1 | |
| ACK | NACK/DTX | ACK | ACK | | | | 1, 0 |
| NACK/DTX | ACK | ACK | ACK | | | 1, 0 | |
| NACK/DTX | NACK/DTX | ACK | ACK | | | | 1, 1 |
| ACK | ACK | ACK | DTX | | 1, 1 | | |
| ACK | NACK/DTX | ACK | DTX | | 1, 0 | | |
| NACK/DTX | ACK | ACK | DTX | | 0, 1 | | |
| NACK/DTX | NACK/DTX | ACK | DTX | | | 1, 1 | |
| ACK | ACK | NACK/DTX | ACK | 1, 1 | | | |
| ACK | NACK/DTX | NACK/DTX | ACK | | | | 0, 1 |
| NACK/DTX | ACK | NACK/DTX | ACK | 0, 1 | | | |
| NACK/DTX | NACK/DTX | NACK/DTX | ACK | | | | 0, 0 |
| ACK | ACK | NACK/DTX | DTX | | | | |
| ACK | NACK/DTX | NACK/DTX | DTX | 1, 0 | | | |
| NACK/DTX | ACK | NACK/DTX | DTX | | 0, 0 | | |
| NACK | NACK/DTX | DTX | DTX | 0, 0 | | | |
| NACK/DTX | NACK/DTX | NACK | DTX | | | 0, 0 | |
| DTX | NACK/DTX | DTX | DTX | | No Transmission | | |

15. A receiving apparatus (UE) for providing to a transmitting apparatus (eNB) simultaneously feedback on a reconfiguration attempt of a search space for an enhanced physical downlink control channel (e-PDCCH) and feedback on at least one downlink transmission, the receiving apparatus (UE) being configured with at least one serving cell including a primary cell and comprising:

a receiver configured to receive the at least one downlink transmission via at least one serving cell from the transmitting apparatus, and configured to receive from the transmitting apparatus reconfiguration information for reconfiguration of the search spaces for at least one serving cell, a processor configured to determine for the at least one downlink transmission whether the received downlink transmission is successfully decodable, and configured to determine whether the received reconfiguration information is successfully decodable, wherein transmission via the primary cell includes reception of at least one transport block, to which a first uplink, PUCCH, resource corresponds, and/or wherein the selected uplink, PUCCH, resources is at least one of:

a first PUCCH resource, defined as PUCCH resource 0, corresponding to the reception of the at least one transport block via the primary cell, a second PUCCH resource, defined as PUCCH resource 1, corresponding to the PDCCH for E-PDCCH reconfiguration information received via the primary cell, the second PUCCH resource being derived from the first control channel element, CCE, of the PDCCH for E-PDCCH reconfiguration information.

18. The receiving apparatus according to claim 17, wherein, in case the reception of one downlink transmission via the primary serving cell includes reception of a first transport block, a first position of the feedback tuple, defined as HARQ-ACK(0), indicates a successful/un-successful decoding of the first transport block received via the primary cell, a second position of the feedback tuple, defined as HARQ-ACK(1), indicates a successful/un-successful decoding of the reconfiguration information received via the primary cell, or wherein, in case the reception of one downlink transmission via the primary serving cell includes reception of a first and a second transport block, a first position of the feedback tuple, defined as HARQ-ACK(0), indicates a successful/un-successful decoding of the first transport block received via the primary cell, a second position of the feedback tuple, defined as HARQ-ACK(1), indicates a successful/un-successful decoding of the second transport block received via the primary cell, and a third position of the feedback tuple, defined as HARQ-ACK(2), indicates a successful/un-successful decoding of the reconfiguration information received via the primary cell.

19. A non-transitory computer readable medium storing instructions that, when executed by a processor of a receiving apparatus, cause the receiving apparatus (UE) configured with at least one serving cell to provide simultaneously feedback on a reconfiguration attempt of a search space for an enhanced physical downlink control channel (e-PDCCH) and feedback on at least one downlink transmission, to a transmitting apparatus (eNB) by:

receiving the at least one downlink transmission via at least one serving cell from the transmitting apparatus, and receiving from the transmitting apparatus reconfiguration information for reconfiguration of the search spaces for at least one serving cell, determining for the at least one downlink transmission whether the received downlink transmission is successfully decodable, and determining whether the received reconfiguration information is successfully decodable, wherein generating a feedback tuple including ACK/NACK/DTXs determined based on the successful/un-successful decoding of the at least one downlink transmission and including ACK/DTXs determined based on the successful/un-successful decoding of the reconfiguration information, and transmitting the feedback tuple as a combination of:

a selected one of a plurality of uplink resources available for transmitting the feedback tuple via the primary cell, and a selected one of a plurality of modulation symbols of a modulation scheme for transmission on the selected uplink resource.

\* \* \* \* \*